(12) United States Patent
Rav-Niv et al.

(10) Patent No.: US 7,750,224 B1
(45) Date of Patent: Jul. 6, 2010

(54) MUSICAL COMPOSITION USER INTERFACE REPRESENTATION

(75) Inventors: Eyal Rav-Niv, Tel Aviv (IL); Rami Kasterstein, Tel Aviv (IL)

(73) Assignee: Neocraft Ltd., Ramat-Gan (IL)

( * ) Notice: Subject to any disclaimer, the term of this patent is extended or adjusted under 35 U.S.C. 154(b) by 99 days.

(21) Appl. No.: 12/221,804

(22) Filed: Aug. 7, 2008

Related U.S. Application Data

(60) Provisional application No. 60/964,107, filed on Aug. 9, 2007.

(51) Int. Cl.
*G09B 15/00* (2006.01)
(52) U.S. Cl. .................... 84/483.1; 84/483.2; 84/485 R
(58) Field of Classification Search ................ 84/483.1, 84/483.2, 485 R
See application file for complete search history.

(56) References Cited

U.S. PATENT DOCUMENTS

| | | | | |
|---|---|---|---|---|
| 357,168 A * | 2/1887 | Barnwell | .................. | 84/314 R |
| 2,814,231 A * | 11/1957 | Jones | ........................ | 84/485 R |
| 3,369,439 A * | 2/1968 | Burdet | ....................... | 84/483.1 |
| 3,379,088 A * | 4/1968 | Fox | ........................... | 84/485 R |
| 3,403,590 A * | 10/1968 | Quinton | .................... | 84/470 R |
| 3,403,591 A * | 10/1968 | Weitzner | .................. | 84/485 R |
| 3,668,967 A * | 6/1972 | Malis | ........................ | 84/471 R |
| 3,845,686 A * | 11/1974 | Salvo | ........................ | 84/485 R |
| 3,978,756 A * | 9/1976 | Feldman | .................... | 84/470 R |
| 4,559,861 A * | 12/1985 | Patty et al. | ................ | 84/470 R |
| 4,602,550 A * | 7/1986 | Dadi et al. | ..................... | 84/473 |
| 4,791,848 A * | 12/1988 | Blum, Jr. | ...................... | 84/453 |
| 5,392,682 A * | 2/1995 | McCartney-Hoy | ........ | 84/470 R |
| 5,429,029 A * | 7/1995 | Mendiola, Jr. | ............ | 84/471 R |
| 5,524,522 A * | 6/1996 | Hesnan | ....................... | 84/473 |
| 5,585,583 A * | 12/1996 | Owen | ........................ | 84/470 R |
| 6,087,577 A * | 7/2000 | Yahata et al. | .................. | 84/478 |
| 6,107,557 A * | 8/2000 | Fukada | ....................... | 84/485 R |
| 6,162,981 A * | 12/2000 | Newcomer et al. | ........ | 84/485 R |
| 6,201,174 B1 * | 3/2001 | Eller | ........................ | 84/477 R |
| 6,414,231 B1 * | 7/2002 | Miyamoto et al. | ........ | 84/477 R |

(Continued)

*Primary Examiner*—David S. Warren

(57) ABSTRACT

Graphical musical user interface representation for presenting a stringed musical instrument composition, the stringed musical instrument composition including a plurality of note representations, the graphical musical user interface representation including a plurality of graphically encoded note path representations that include a plurality of graphically encoded note representations, and a plurality of graphically encoded note transitions, the plurality of graphically encoded note path representations are located in a coordinate system of the graphical musical user interface representation, each of the graphically encoded note path representations corresponding to a respective open-string pitch, of a respective string of a stringed musical instrument, the plurality of graphically encoded note representation are of a respective note group of note representations, the respective note group being associated with the respective string, each of the graphically encoded note path representations being encoded according to a respective graphical code, the respective graphical code being respective of said respective open-string pitch, each of the graphically encoded note representations representing respective tonal characteristics, relative to the respective open-string pitch, according to a coordinate of the respective graphically encoded note representation, in the coordinate system, and according to the respective graphical code, the plurality of graphically encoded note transitions being respective of the respective note group, each of the graphically encoded note transitions being encoded according to the respective graphical code.

49 Claims, 12 Drawing Sheets
(10 of 12 Drawing Sheet(s) Filed in Color)

U.S. PATENT DOCUMENTS

| | | | |
|---|---|---|---|
| 6,483,018 B2* | 11/2002 | Mead | 84/477 R |
| 6,515,211 B2* | 2/2003 | Umezawa et al. | 84/477 R |
| 6,930,235 B2* | 8/2005 | Sandborn et al. | 84/483.2 |
| 6,987,220 B2* | 1/2006 | Holcombe | 84/483.2 |
| 6,995,310 B1* | 2/2006 | Knapp et al. | 84/722 |
| 7,030,307 B2* | 4/2006 | Wedel | 84/477 R |
| 7,196,260 B2* | 3/2007 | Schultz | 84/613 |
| 7,212,213 B2* | 5/2007 | Steinberg et al. | 345/589 |
| 7,238,876 B1* | 7/2007 | Worrall et al. | 84/722 |
| 7,241,945 B1* | 7/2007 | Egan | 84/483.2 |
| 7,355,110 B2* | 4/2008 | Nash | 84/601 |
| 7,459,624 B2* | 12/2008 | Schmidt et al. | 84/477 R |
| 7,482,525 B2* | 1/2009 | Reverdin | 84/485 R |
| 7,521,619 B2* | 4/2009 | Salter | 84/477 R |
| 2004/0007118 A1* | 1/2004 | Holcombe | 84/483.2 |
| 2004/0099124 A1* | 5/2004 | Deverich | 84/483.1 |
| 2004/0200335 A1* | 10/2004 | Phillips | 84/483.2 |
| 2007/0256540 A1* | 11/2007 | Salter | 84/485 R |
| 2007/0256551 A1* | 11/2007 | Knapp et al. | 84/722 |
| 2007/0295194 A1* | 12/2007 | Reverdin | 84/470 R |
| 2008/0141849 A1* | 6/2008 | Johnston | 84/483.2 |
| 2009/0235808 A1* | 9/2009 | Salter | 84/485 R |

* cited by examiner

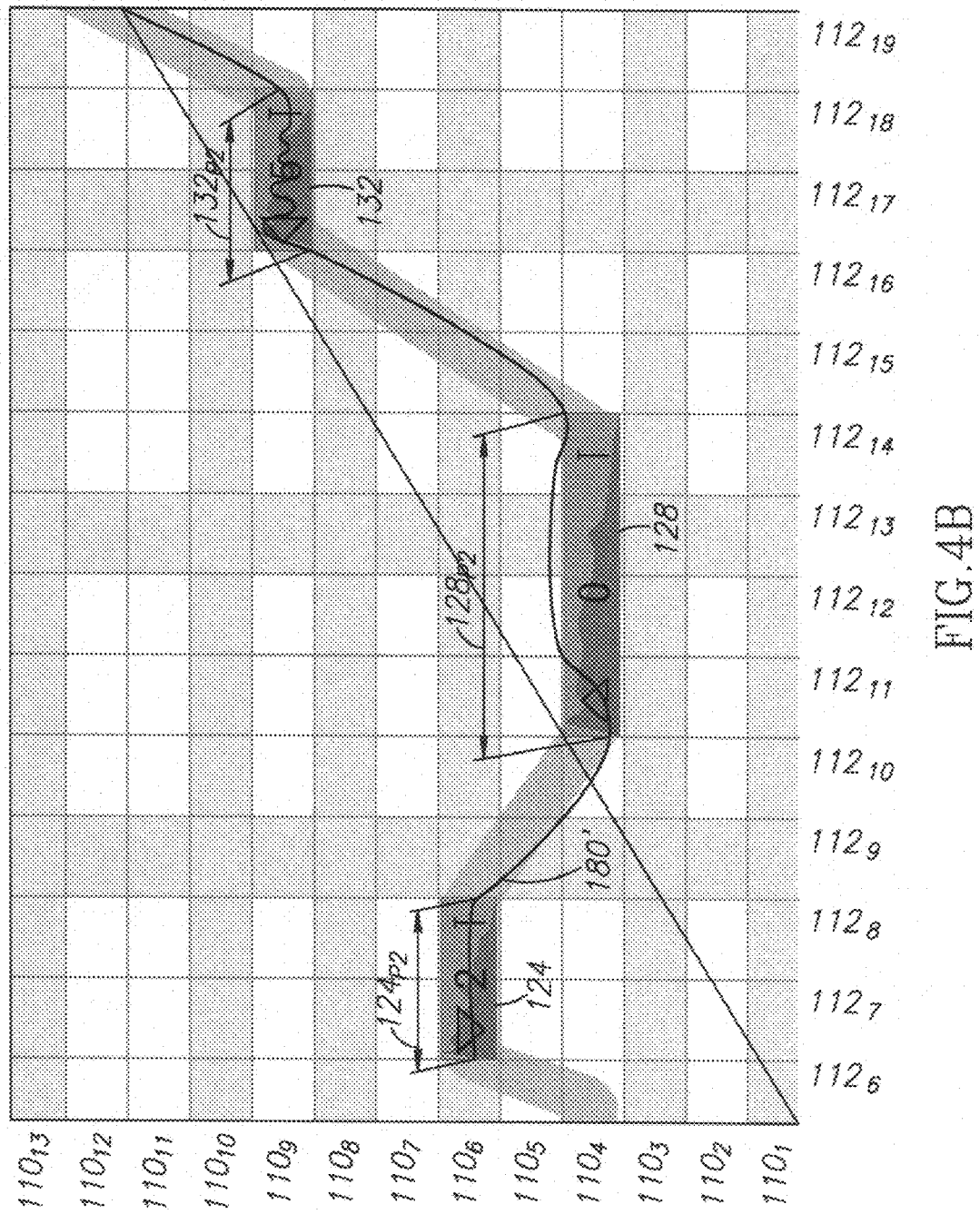

MUSICAL COMPOSITION USER INTERFACE REPRESENTATION

CROSS-REFERENCE TO RELATED CASES

This application claims priority to, and the benefit of Provisional U.S. Patent Application Ser. No. 60/964,107, filed Aug. 9, 2007, the entirety of which is incorporated herein by reference.

FIELD OF THE DISCLOSED TECHNIQUE

The disclosed technique relates to data representation in general, and to a user interface representation of a musical composition, in particular.

BACKGROUND OF THE DISCLOSED TECHNIQUE

Various types of systems for representing a musical composition are known in the art. One type of such a system is standard staff notation, which is a form of musical notation that specifies the rhythm and duration of notes along with their corresponding pitches on a staff. Another type of system is a tablature for stringed instruments, which is a form of musical notation that specifies where and when to place ones fingers on the stringed instrument, instead of which pitches to play. User interfaces for representing a musical composition, such as tablature editors, the musical instrument digital interface (MIDI) and digital audio workstations (DAWs), allow a user to view a tablature notation representation, a music notation representation (e.g., a music score) or alternatively, a sound signal representation of the sounds (e.g., a waveform).

The user may edit and manipulate the various parameters of the audio information such as the pitch, amplitude and duration of each note in a music notation view of the audio information. The audio information can be manipulated via a user interface to correct playing errors, to compose new music and to modify existing notes. Furthermore, DAWs can also allow the user to apply sound effects to particular segments of the sound or to individual notes. For example, the user may adjust the vibrato of a played note, smooth the transitions between notes, apply flanging effects, shift the formant frequencies of a note or a selection of notes and apply tempo changes.

An example of a DAW known in the art is Melodyne, commercially available by Celemony Software GmbH, which is an audio recording and editing software, having a user interface that allows a user to process and manipulate audio material. Melodyne can be used to analyze audio files in order to identify key aspects of their musical content. Melodyne can recognize individual notes from a recorded musical composition and vary the musical parameters of the notes such as pitch, and time duration.

Reference is now made to FIG. 1, which is a prior art schematic illustration of a graphical user interface (GUI) of an editor display of Melodyne, generally referenced 50. Editor display 50 displays a two-dimensional (2-D) representation of an audio material. Editor display 50 includes an edit pane 52 and a note ruler 54. Note ruler 54 includes a plurality of units, which represent the note symbols of a Western musical system 58. The horizontal axis of edit pane 52 represents time and the vertical axis of edit pane 52 represents pitch.

Edit pane 52 and note ruler 54 are partitioned by a plurality of horizontal lanes 56. Different vertical positions within an area confined by a horizontal lane represent a variation in pitch of at most one tone. A higher vertical position on note ruler 54 indicates a higher pitch and a lower vertical position on note ruler 54 indicates a lower pitch. Melodyne identifies individual notes in the audio material. Each note is represented by a note blob, and is displayed on edit pane 52 at different positions corresponding to the timing and pitch of the respective note.

For example, FIG. 1 depicts nine note blobs $60_1$, $60_2$, $60_3$, $60_4$, $60_5$, $60_6$, $60_7$, $60_8$ and $60_9$ of the audio material. The contour of each of note blobs $60_1$-$60_9$ represents a variation of the blob of that particular note amplitude envelope in time (i.e., the manner in which the amplitude of the note changes over time). Each note blob includes a respective pitch curve, labeled $62_1$-$62_9$ (i.e., a pitch curve is a curve signifying the variation of the pitch over time). In Melodyne, pitch curves $62_1$-$62_9$ are continuous lines that thread through their respective note blobs.

Melodyne also allows a user to manipulate the characteristics of a single note or a phrase (i.e., a musical passage, analogous to a clause in language). For example, the user can transpose notes upward or downward along note ruler 54 and can also vary the pitch of a note at intervals smaller than a tone (i.e., fractional tones). Melodyne can furthermore automatically correct the pitch of a played note (i.e., intonation), for example, if a particular note is played out of tune.

Other features of Melodyne include changing the tempo of the musical piece as well as the timing (i.e., the position and duration) of an individual note by horizontally stretching or squeezing the corresponding note blob. The user can also alter the amplitude of a note by manipulating the shape of the respective note blob amplitude envelope. The user can furthermore cut and paste or drag note blobs at different points in time and at different positions along pitch ruler 54. Melodyne also allows the user to vary the formants (i.e., emphasized resonant frequencies) of musical instruments. For example, by transposing the formants of a voice recording upward, the voice is given a more feminine character. Additionally, Melodyne can display notes on a staff, according to a musical notation representation.

SUMMARY OF THE PRESENT DISCLOSED TECHNIQUE

It is an object of the disclosed technique to provide a novel graphical musical user interface representation which overcomes the disadvantages of the prior art. In accordance with the disclosed technique, there is thus provided a graphical musical user interface representation for presenting a stringed musical instrument composition.

The graphical musical user interface representation includes a plurality of note representations and a plurality of graphically encoded note path representations, which include a plurality of graphically encoded note representations, and a plurality of graphically encoded note transitions. The graphically encoded note path representations are located in a coordinate system of the graphical musical user interface representation. Each of the graphically encoded note path representations corresponds to a respective open-string pitch of a respective string of a stringed musical instrument. Each of the graphically encoded note representations are of a respective note group of note representations. Each note group is associated with the respective string of the stringed musical instrument. Each of the graphically encoded note path representations is encoded according to a respective graphical code, respective of the open-string pitch. Each of the graphically encoded note representations represents tonal characteristic relative to the respective open-string pitch, according to a coordinate of the respective graphically encoded note representation the coordinate system. Each of the graphically encoded note representations is respective of the respective graphical code. Each of the graphically encoded note transitions is respective of the respective note group. Each of the graphically encoded note transitions is encoded according to the respective graphical code.

According to another aspect of the disclosed technique, there is thus provided a method for providing a graphical musical user interface representation. The graphical musical user interface representation presenting a stringed musical instrument composition. The stringed musical instrument composition includes a plurality of note representations. The method includes the procedures of defining a coordinate system, sorting the note representations to respective one of a plurality of note groups, graphically encoding each of the note groups, embedding the graphically encoded note groups with the coordinate system, producing a plurality of note path representations by successively connecting the note representations in each of the note groups, and graphically encoding each of the note path representations according to the respective graphical code. Each of the note groups corresponds to a respective string of a stringed musical instrument and the graphical encoding of each note group is according to a respective graphical code.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosed technique will be understood and appreciated more fully from the following detailed description taken in conjunction with the drawings in which:

FIG. 4B is a schematic illustration of FIG. 4A, wherein the pitch envelope has been modified, constructed and operative in accordance with a further embodiment of the disclosed technique;

DETAILED DESCRIPTION OF THE EMBODIMENTS

Figure 1:
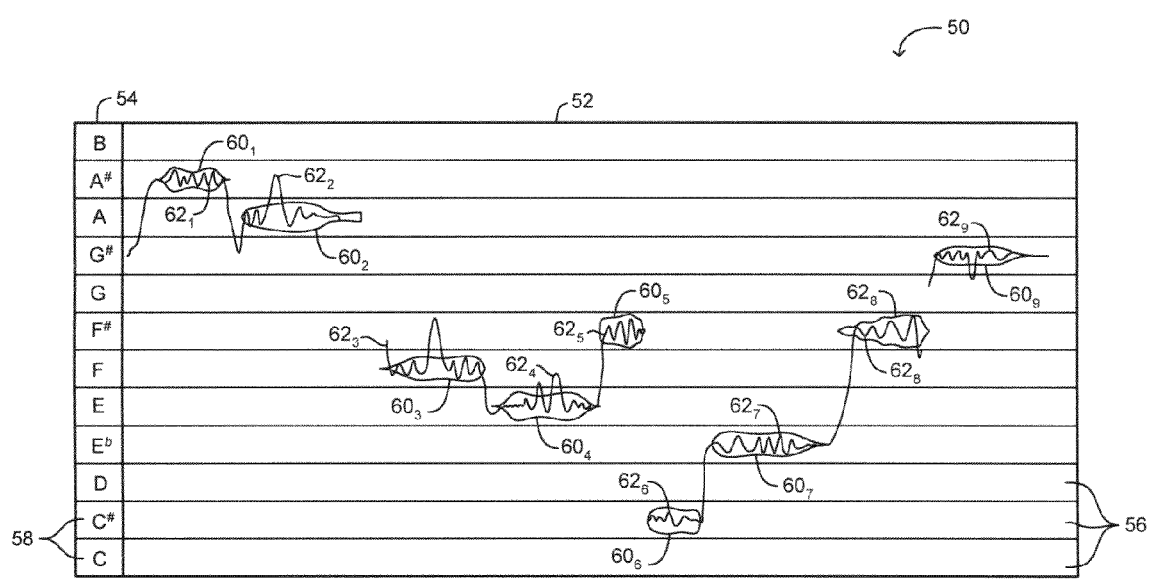
FIG. 1, which is a prior art schematic illustration of a graphical user interface (GUI) of an editor display of Melodyne, generally referenced 50.

The disclosed technique overcomes the disadvantages of the prior art by providing a novel graphical user interface (GUI) representation of a musical composition. The GUI representation includes a fret key, which combines a tablature representation of the musical composition with that of a piano-string span (e.g., analogous to a piano roll). The GUI displays a plurality of note representations, which represent the notes that make up the musical piece. Note representations are placed within a grid of the fret key according to a plurality of characteristics, such as fret number (i.e., pertaining to the tablature representation aspect of the GUI representation), pitch (i.e., pertaining to the piano-string span aspect of the GUI representation), timing and time duration (i.e., pertaining to a timeline of GUI representation), and the like.

Note representations are divided into a plurality of groups, and follow a color-coding scheme, according to the string from which they are played from a string instrument. Furthermore, note representations from each particular group are interconnected by a plurality of paths, which follow the same color-coding scheme employed by each respective group of the note representations. Each path provides a continuous color-coded graphical representation of successive note representations, within a given group of note representations. The paths further provide a graphical representation of the transitions between successive note representations, within each group of the note representations.

The GUI representation displays various attributes associated with each note representation, such as the timbre, amplitude envelope, pitch curve, and the like. The GUI representation provides the user with control over various aspects such as the manipulation of the aforementioned attributes of each note representation, and the like. The user can further delete, move, lengthen, shorten, copy and paste, and add new note representations.

The term "pitch" herein below refers to a perceived fundamental (or dominant) frequency of a sound. The term "note" herein below refers to a graphical representation, in a musical notation system, of the duration and pitch of a sound, which can be generated by a musical instrument, a human voice, a synthesizer, and the like. A note can also be given a note name, (e.g., $A^\sharp$, do bemolle, middle C). The distance between two notes is referred to in music theory as an interval. The interval between two notes is referred to as an octave (8ve or 8va), if the pitch of one note is double (or half) the pitch of the other note.

A musical system defines the basic constituents (e.g., pitches) and their relationship (e.g., evenly spaced intervals). An example of a musical system is the modern Western musical system, which most commonly includes a twelve-tone equal temperament (12-TET). In this system, there are 12 interval units called semitones, each semitone representing a particular pitch, which are spaced (e.g., distributed) evenly within an octave. Each pitch possesses a definite frequency associated with a note name (e.g., the 12 note names C, C♯, D, E♭, E, F, F♯, G, A♭, A, B♭ and B). A reference to a note can include the octave numbering, in addition to the note symbol, or name.

For example, according to the Western musical system, the note symbol "A4" refers to a note representing the frequency of 440 Hz, in the fifth octave (A4 is also the standardized tuning pitch of the Western musical system, sometimes known as "concert pitch"). The note of a frequency of 880 Hz is referred to as "A5", since it originates from the sixth octave, whereas the interval between A4 and A5 is an octave, since the pitch of A4 is half that of A5.

The term "beat" herein below refers to the basic recurrent rhythmic time unit in a musical piece, the commencement of the time unit corresponding to each tick on a metronome, or at which repetitive pulses can be perceived. The term "measure" herein below refers to a grouping of a given number of musical beats located between two consecutive vertical lines (i.e., bars) on a staff. The term "meter" herein below refers to a basic recurring rhythmical pattern of beats per measure, note values, accents, and the like, indicated in Western music notation by a symbol dubbed a time signature. The term "time signature" herein below refers to a notational convention employed in Western musical notation to indicate a meter, typically written as a fraction, the denominator indicating the kind of note used as a unit of time and the numerator indicating the number of units in each measure.

Any reference to a musical system will hereinafter refer to the Western musical system, unless otherwise specified. It should be noted that the disclosed technique is not constrained by the frameworks of one particular musical system, but is applicable to other musical systems based on different musical temperaments (e.g., the modern Arabic music system which is based on 24-TET).

A string instrument or stringed instrument (hereinafter referred to as a "string instrument") is a musical instrument that generates sound by the vibration of at least one string. A string instrument typically includes a body, a neck, and a head (or headstock). The body typically includes a bridge, and a hollow resonating chamber for amplifying the sound produced by the vibration of the string. The neck typically includes a fingerboard, onto which the strings are pressed by the musician, thereby shortening the vibrating length of the strings. The head typically includes a plurality of tuning pegs. The strings of the string instrument typically extend from the bridge, across the resonating chamber and the fingerboard, to the tuning pegs.

The frequency of a vibrating string is governed by extensive properties, such as the length, the gauge (i.e., the diameter) and the mass of the string, intensive properties such as the density (which is dependent on the composition or physical makeup of the string), as well as the forces acting on the string, such as the tensile force. A musician playing a string instrument may dynamically vary the frequency of a string by shortening the vibrating length of the string.

For example, in a guitar, the frequency may be varied by pressing the string against the fingerboard at different positions. The musician may also tune the string to vibrate at a particular frequency (e.g., by employing a reference pitch from a tuning fork or a tuned musical instrument). For example, by turning the tuning keys of a guitar, the tension of the string can be varied, thus changing the frequency of the vibrating string.

Certain string instruments (e.g., classical guitars, banjos, mandolins) include a plurality of markings extending across the width of the fingerboard (or fretboard) on the neck of the string instrument. These markings are referred to as frets and they are typically metallic, protruding strips mounted on the fingerboard. The frets divide the fingerboard into a plurality of segments corresponding to intervals related to the musical system employed. For example, in string instruments which employ the standard Western musical system (e.g., guitars), each fret represents one semitone. A musician playing a particular note on a particular string of a string instrument typically frets (i.e., presses the string against a fret to shorten the vibrating length) with the fretting hand while the musician picks the string (e.g., brushes or displaces the string) with the picking hand.

The frets provide the musician with visual and tactile cues for facilitating an acceptable measure of intonation. The frets further provide an adequate node at the extremity of the vibrating string (i.e., through a more rigid mechanical coupling between the string extremity and fingerboard, which would otherwise be floppy without frets). Unless a note is played on an open string (i.e., without fretting), defining an open-string pitch, the musician frets the string at the precise fret corresponding to the desired note.

The sounds emanating from two different string instruments (e.g., a violin and a viola) playing the same note at the same amplitude, are distinguished by what is known in the art as timbre (also known as "tone quality" or "sound color"). Also, the musician playing a string instrument can employ different methods to strum the strings of the string instrument, known as picking patterns. Several picking patterns include for example, plucking the strings, bowing the strings, using a plectrum, and picking the strings in different directions. These different picking patterns can all be considered sounds which can be differentiated according to timbre.

The term "music notation" or "musical notation" herein below are interchangeable, and refer to a written representation, or a system of writing music. One example of a music notation is the standard Western music notation, which incorporates a five-line stave (or staff). Notes on the staff together with accidentals (e.g., flat, sharp, natural, half-sharp, double-flat) allow the explicit representation of a pitch. Another type of music notation is the tablature (i.e., "tab" in shorthand), typically employed for fretted string instruments, which is a grid designating which fret on which string to depress in order to play a particular note. Pitch is therefore denoted implicitly in the tablature representation.

Figure 2:
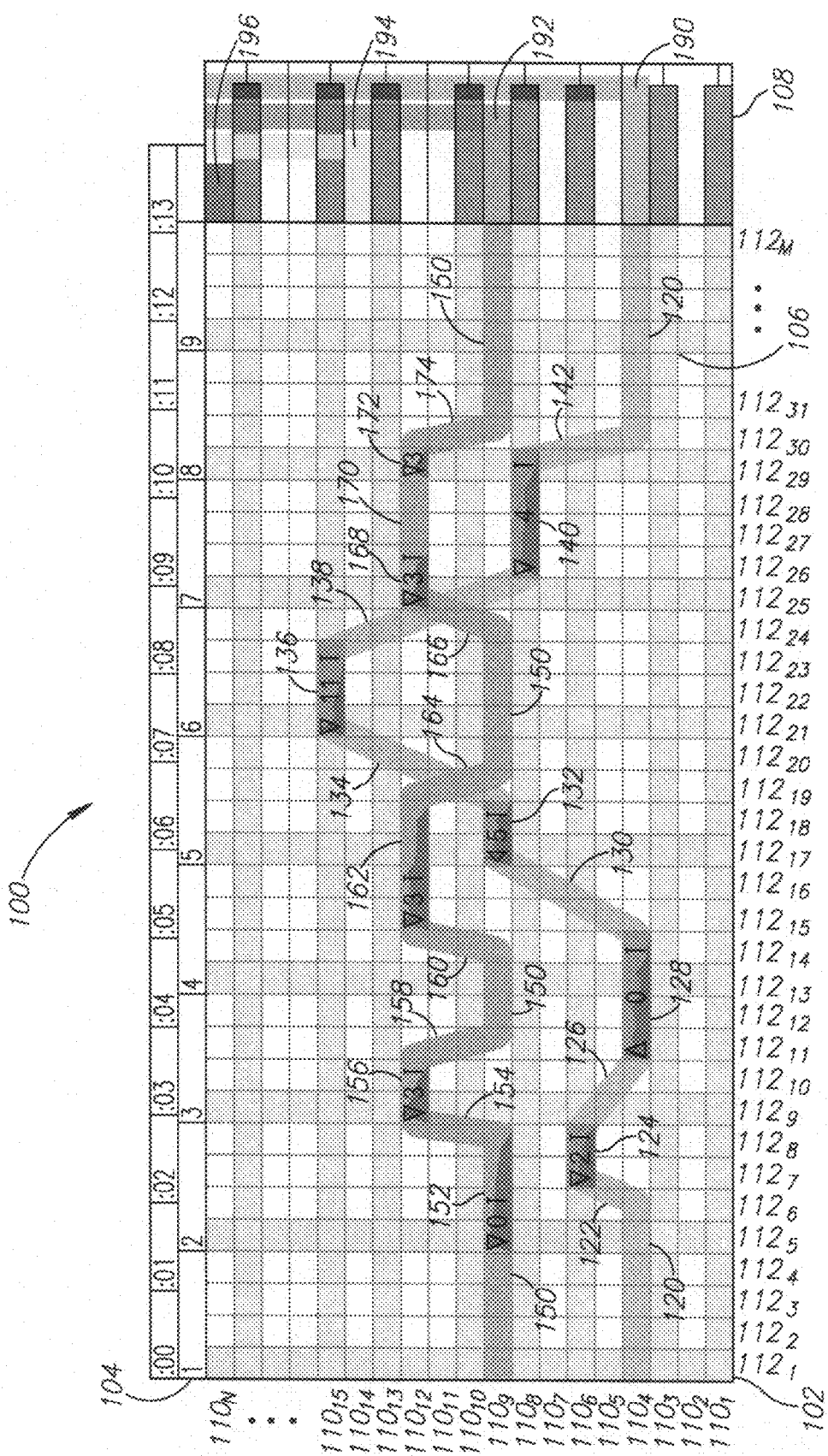
FIG. 2, which is a schematic illustration of a GUI, generally referenced 100, constructed and operative in accordance with an embodiment of the disclosed technique.

Reference is now made to FIG. 2, which is a schematic illustration of a GUI, generally referenced 100, constructed and operative in accordance with an embodiment of the disclosed technique. GUI 100 (i.e., graphical musical user interface representation), includes a fret key 102 and a timeline 104. Fret key 102 includes a grid 106 and a piano-string span 108. GUI 100 further includes a menu bar (not shown), a tool bar (not shown), and a navigator (not shown). Grid 106 includes a plurality of rows $110_1$, $110_2$, $110_N$, each of which represents a different pitch, and a plurality of columns $112_1$, $112_2$, $112_M$, each of which represents a different time interval (e.g., unit, period of time). Therefore, grid 106 defines a coordinate system, whereby a coordinate in this coordinate system possesses two components (i.e., such as in a two dimensional coordinate system). One of the components of the coordinate denotes tonal characteristics (e.g., pitch), the other denotes a time value. Each of columns $112_1, 112_2, 112_M$ is graphically encoded (e.g., either light-colored or dark-colored), depending on the time signature or the meter of a particular musical piece as explained below. GUI 100 represents a stringed musical instrument composition. The stringed musical instrument composition includes a plurality of notes, which are respectively represented by note representations.

A reference pitch representation section of GUI 100 is represented by piano-string span 108. Accordingly, piano-string span 108 is positioned adjacent to grid 106, along a vertical dimension (e.g., vertical direction or vertical axis) of grid 106 within GUI 100. Timeline 104 is positioned adjacent to fret key 102, along a horizontal dimension (e.g., horizontal direction or horizontal axis) of fret key 102. Piano-string span 108 includes a plurality of graphically encoded discrete reference pitch value representations. It is noted that piano-string span 108 is associated with musical instruments other than a piano (not shown) such as musical instruments possessing fixed-pitches (e.g., a drum). Piano-string span 108 is divided into a plurality of dark-colored and light-colored horizontal strips, depicting a graphical representation of the keys (not shown) of a piano keyboard (not shown). A selection of the graphically encoded discrete reference pitch values of piano-string span 108 represent a respective open-string pitch (e.g., the horizontal strips which are colored blue, and red) of the stringed musical instrument. Alternatively, each of the graphically encoded discrete reference pitch value representations can be encoded according to different graphical codes. For example, the graphical representation of the horizontal strips can assume other possibilities (e.g., color-coded, symbolically coded). The dark-colored and light-colored horizontal strips of piano-string span 108 are aligned with rows $110_1, 110_2, 110_N$ of grid 106. Each of rows $110_1, 110_2, 110_N$ can be graphically encoded to correspond to respective ones of the graphically encoded discrete pitch value representations. The graphically encoded discrete reference pitch value representations are graphically associated with respective ones of the note representations. Graphical association can include a particular graphical encoding employed, collective delineation (not shown), symbolic encoding (not shown), textual encoding (not shown), and having the same horizontal coordinate in grid 106. Piano-string span 108 includes at least one string-range indicator, which is a vertical color-coded line that represents the playing pitch-range (i.e., playable pitch-range) of a particular string belonging to a string instrument.

FIG. 2 illustrates two string-range indicators 190 and 192. String-range indicator 190 spans from E1 to E3 (not shown) and string-range indicator 192 spans from A1 to A3 (not shown). It will be shown herein below, with reference to FIG. 6 that GUI 100 can display a plurality of string-range indicators.

GUI 100 further includes two groups of note representations (i.e., each group can be denoted as "note group"), a first group of note representations (hereinafter referred to as Group 1), and a second group of note representations (hereinafter referred to as Group 2), which are each color-coded differently. Each group of the note representations represents a group of notes that are played from a specific string of the string instrument. FIG. 2 illustrates two groups of note representations, representing a string instrument possessing two strings. Group 1 includes note representations 124, 128, 132, 136, and 140. Group 2 includes note representations 152, 156, 162, 168, and 172.

It is noted that FIG. 2 demonstrates a simplified case for the purpose of elucidating the disclosed technique. Alternatively, any number of groups of note representations may be illustrated to represent a string instrument with a different number of strings, (e.g., four strings for a violin, seven strings for a Chinese guqin, thirteen strings for a Japanese koto, and eighteen to twenty strings for an Indian sitar). A scheme with six groups of note representations (e.g., a classical guitar) is disclosed herein below in detail, in conjunction with FIG. 6.

Group 1 represents a group of notes that are played from a first string (not shown) of the string instrument. Group 2 represents a group of notes that are played from a second string (not shown) of the string instrument. Each group of the note representations includes individual note representations. Each of the note representations represents an individual note (i.e., possessing tonal characteristics, such as pitch), which is geometrically illustrated by a rectangle of a characteristic shape. The horizontal dimension of each of the individual note representations, hereinafter referred to as "length", signifies the note duration of its respective note representation (e.g., a quarter note, an eighth note). Each of the note representations is graphically encoded, and hence, can be denoted as graphically encoded note representations.

Alternatively, the note representations can assume shapes other than a rectangular, (e.g., elliptical, triangular). Numerical and graphical information associated with each note (e.g., amplitude and articulation) is displayed within each note representation, and is described herein below in connection with FIG. 3A.

Each of rows $110_1, 110_2, 110_N$ represents a geometric place on grid 106 of a different pitch. A higher vertical position of a row corresponds to a higher pitch. Each of columns $112_1, 112_2, 112_M$ represents a different unit time interval in the musical piece, and each are equal in terms of the time interval they represent. A dark-colored column represents a first beat in a measure of the musical piece. Successive light-colored columns each represent successive beats within the measure. Hence, columns $112_1, 112_2, 112_M$ can be graphically encoded according to a meter of the stringed musical instrument composition. Alternatively, the dark-colored and light-colored columns can be interchanged, and furthermore can employ other coloring schemes (e.g., shades of gray, different colors).

For example, FIG. 2 depicts (in a repetitive manner) one dark-colored column followed by three light-colored columns, indicating that there are four beats per measure. Each of the note representations is positioned at a specific row, indicative of its pitch, and possesses a specific length along timeline 104, indicative of its duration. Hence, at least one dimension of each note representation can represent its respective time duration.

Note representations belonging to Group 1 and Group 2 are distributed (e.g., embedded) within fret key 102 according to pitch, timing and time duration in a manner that is a descriptively faithful representation of the musical piece. Hence, the note representations are located in the coordinate system (i.e., grid 106) of GUI 100. Note representation 124 is positioned at row $110_6$, corresponding to the note $B^{\flat}$, and between columns $112_6$ and $112_9$, corresponding to a note duration equivalent to two beats. Note representation 128 is positioned at row $110_4$, corresponding to the note C, and between columns $112_{10}$ and $112_{15}$, corresponding to a note duration equivalent to four beats (or the duration of one whole measure).

Note representation 132 is positioned at row $110_9$, corresponding to the note G, and between columns $112_{16}$ and $112_{19}$, corresponding to a note duration equivalent to two beats. Note representation 136 is positioned at row $110_{15}$, corresponding to the note $C^4$, and between columns $112_{20}$ and $112_{24}$, corresponding to a note duration equivalent to three beats. Note representation 140 is positioned at row $110_8$, corresponding to the note $A^b$, and between columns $112_{25}$ and $112_{30}$, corresponding to a note duration equivalent to four beats.

Note representation 152 from Group 2 is positioned at row $110_9$, corresponding to the note G, and between columns $112_4$ and $112_9$, corresponding to a note duration equivalent to four beats. Note representation 156 is positioned at row $110_{12}$, corresponding to the note E, and between columns $112_8$ and $112_{11}$, corresponding to a note duration equivalent to two beats. Note representation 162 is positioned at row $110_{12}$, corresponding to the note E, and between columns $112_{14}$ and $112_{19}$, corresponding to a note duration equivalent to four beats.

Note representation 168 is positioned at row $110_{12}$, corresponding to the note E, and between columns $112_{24}$ and $112_{27}$, corresponding to a note duration equivalent to two beats. Note representation 172 is positioned at row $110_{12}$, corresponding to the note E, and between columns $112_{28}$ and $112_{30}$, corresponding to a note duration equivalent to one beat.

GUI 100 possesses a plurality of graphically encoded note path representations. Note representations belonging to a specific group of note representations are graphically interconnected by color-coded curves, (i.e., graphically encoded note path representations, hereinafter referred to as "paths") in the following manner. Each of these paths is located within a graphical grid, (i.e., grid 106, adjacent to piano-string span 108). Each note from a particular group of note representations is connected with corresponding adjacent note representations. Such note representations either precede (i.e., apart from the first note representation) or follow (i.e., apart from the last note representation). Each path is graphically encoded according to the graphical code employed by respective group of note representations (i.e., each path is color-coded to match the color-coding scheme employed by each respective group of note representations). Each note representation possesses tonal characteristics (e.g., pitch, timbre), relative to the respective open-string pitch, and also possesses a coordinate position within grid 106 (i.e., specific location therein), indicating its timing and duration. Each of the graphically encoded note path representations correspond to a respective open-string pitch, of a respective string of the stringed musical instrument. The pitch (i.e., a tonal characteristic) of a particular note representation is represented by its respective position (i.e., coordinates) in grid 106.

Group 1 includes four paths 126, 130, 134, and 138, which interconnect note representations, an open-string path 120, and two paths 122 and 142, which interconnect between the note representations and open-string path 120. All the aforementioned paths belonging to Group 1 are color-coded blue. Path 126 links note representations 124 and 128 and is two beats in duration, path 130 links note representations 128 and 132 and is two beats in duration, path 134 links note representations 132 and 136 and is two beats in duration, and path 138 links note representations 136 and 140 and is also two beats in duration.

The open-string paths are graphically associated with the respective ones of the plurality of graphically encoded discrete reference pitch value representations of piano-string span 108. Examples of graphic association include horizontal alignment within grid 106, graphical encoding (e.g., color-coding), collective delineation, symbolic encoding, textual encoding, and the like. Open-string path 120 is a default path embedded on fret key 102, on the same row (i.e., row $110_4$) that string-range indicator 190 originates (i.e., graphic association via horizontal alignment). Open-string path 120 provides the user with a color-coded graphical indication of how a group of note representations are related to the first string of the string instrument. Therefore, respective paths can define respective open-string paths, when these paths are graphically associated with the respective open-string pitch. Open-string path 120 can also substantially (i.e., at least a portion thereof) represent a rest (i.e., an interval of silence of the musical piece), within a predetermined return-to-zero value. The return-to-zero value is a measure of time (e.g., beats), that determines which of the paths that interconnect between note representations passes through the open-string path. A path that is longer or equal to in duration to the return-to-zero value, passes through the open-string path. Conversely, a path that is shorter in duration than the return-to-zero value does not pass through open-string path.

The return-to-zero value of a particular path, denoted also as the horizontal alignment time value parameter, can be altered interactively by the user (not shown). The horizontal alignment time value parameter therefore defines the number of beats in the stringed musical instrument composition, corresponding to the length of respective open-string length. The return-to-zero value of open-string path 120 is set to two beats in duration. Accordingly, paths interconnecting note representations, which are longer in duration than two beats, pass through the open-string path. Group 1 does not possess paths which are longer in duration than two beats (apart from open-string path 120), therefore none of paths 122 to 142 passes through open string path 120.

Group 2 includes two paths 154 and 170, which interconnect between the note representations, an open-string path 150, and five paths 158, 160, 164, 166, and 174, which interconnect between the note representations and open-string path 150. All the aforementioned paths belonging to Group 2 are color-coded red. Path 154 links note representations 152 and 156 and is zero beats in duration (i.e., notes corresponding to note representations 152 and 156 are played uninterruptedly), path 170 links note representations 168 and 172 and is two beats in duration. Paths 158 and 160 link note representations 156 and 162 through open-string path 150 and are four beats in duration in total. Paths 164 and 166 link note representations 162 and 168 through open-string path 150 and are six beats in duration in total.

The return-to-zero value of open-string path 150 was set to two beats in duration. Therefore, the paths interconnecting note representations 156 and 162 of a total of four beats in duration pass through open-string path 150. The paths interconnecting note representations 162 and 168 equaling a total of six beats in duration pass through open-string path 150. It is noted that when a note representation of an open string coincides (i.e., horizontally aligns) with an open string path of a particular string, then different color schemes are employed to distinguish there-between. For example, note representation 152 coincides with open string path 150, which are each color-coded by a different hue.

It is noted, that the return-to-zero value of an open-string path can assume a duration equivalent to any number of beats (e.g., 0, ¼, 2.8217). It is further noted, that the specific graphical encoding (e.g., color-coding) employed for each group of note representations and paths interlinking note representations, within a particular group, can be altered. For example, Group 1 (including paths) can be color-coded green, while Group 2 (including paths) can be color-coded orange. Alternatively, different groups can employ different shades, different textures, different hues, different borders, different shadowing, and the like, to distinguish the different groups. It is noted that the paths interconnecting between adjacent note representations can be denoted as graphically encoded note transitions, or simply denoted as note transitions.

In another perspective of the disclosed technique, each path can be viewed to include a plurality of note representations of a respective group of note representations, and a plurality of graphically encoded note transitions (i.e., note transitions). Each note group (i.e., group of note representations) is associated with a respective string of the stringed musical instrument. Each of the graphically encoded note transitions belong to a respective group of note representations (i.e., note group), whereby each note groups are distinctly graphically encoded according to the color-coding employed by the respective group of note representations. Each of the graphically encoded note representations are graphically encoded according to the graphical encoding employed by its respective group of note representations.

Paths from different groups of the note representations can overlap (i.e., cross paths), for example, path 134 of Group 1 and path 164 of Group 2. Each path provides a continuous color-coded graphical representation of successive note representations within a given group of note representations. The paths further provide a graphical representation of the transitions between successive note representations within a given group of the note representations. When different paths overlap, a prioritization scheme is employed by GUI 100 in order to determine which path is superimposed on another path. Typically, in such a prioritization scheme, each string is assigned a priority number.

When a particular path possessing a high priority number crosses a path of a low priority number, then the path of the higher priority number is superimposed on the path of the lower priority number, at their mutual area of overlap. For example, path 164 related to a "high string" (i.e., a string of the musical instrument that can produce relatively higher frequencies in comparison to other strings) has a higher priority number than path 134 from a "low string" (i.e., opposite of "high string"). Therefore, path 164 is superimposed on path 134, at their mutual area of overlap. Alternatively, the user of GUI 100 can deactivate the aforementioned prioritization scheme. In this case the color-coding employed in the area of overlap between two or more crossed paths is performed according to a predetermined color mixing scheme.

Various techniques allow music information (e.g., music recording from a musical instrument) to be inputted into the system incorporating GUI 100. Typically, a musician, performer, composer and the like, play a musical piece on a string instrument, which produces sound. The string instrument may be equipped with a polyphonic pickup (not shown) known in the art. For example, the polyphonic pickup for a six-string instrument (a "hexaphonic pickup" or a "hex pickup") includes six transducers, which convert the vibration energy (i.e., acoustic or mechanical kinetic energy) produced by each of the vibrating strings, into electrical energy (i.e., in the form of electrical signals).

Each electrical signal (not shown and hereinafter referred to as a "sound signal"), produced by the polyphonic pickup, is associated with a specific string of the string instrument. It is noted that each group (of note representations from a particular string) represents an individual sound channel, hereinafter referred to as a "sound channel". Each sound signal from a sound channel is separately fed to the system employing GUI 100, via a module (not shown), which includes a digital signal processor (DSP) (not shown). The system employing GUI 100 determines pitches, amplitudes and timbre characteristics from each of the sound signals and transcribes them into GUI 100.

Alternatively, a musical piece is loaded into a system (not shown) employing the disclosed technique, by methods known in the art. For example, the system can load a musical piece in the form of a MIDI (Musical Instrument Digital Interface) file (e.g., bearing the .mid, .smf, and .xmf file extensions). Alternatively, the musical piece can be composed via GUI 100 (e.g., by adding note representations).

GUI 100 is an interactive user interface, which allows the user to manipulate particulars (e.g., timbre characteristics, pitch, duration of a played note, apply functions such as sound effects) of the musical piece. For example, the user can modify the duration of the note representations, cut and paste the note representations, add and delete the note representations, modify timbre characteristics of a note or a selection of notes, modify the pitch and amplitude characteristics of a note, add sound effects to a particular note, and the like.

The user can input commands and can control the particulars (partly exemplified above) of the music piece, shown by GUI 100, by employing techniques known in the art, such as a computer keyboard (not shown), voice-recognition software and hardware (not shown), pointing devices (e.g., touch-sensitive screen, mouse, graphical tablet, joystick, multi-touch surface, and pointing fingers), and the like.

Figure 3A:
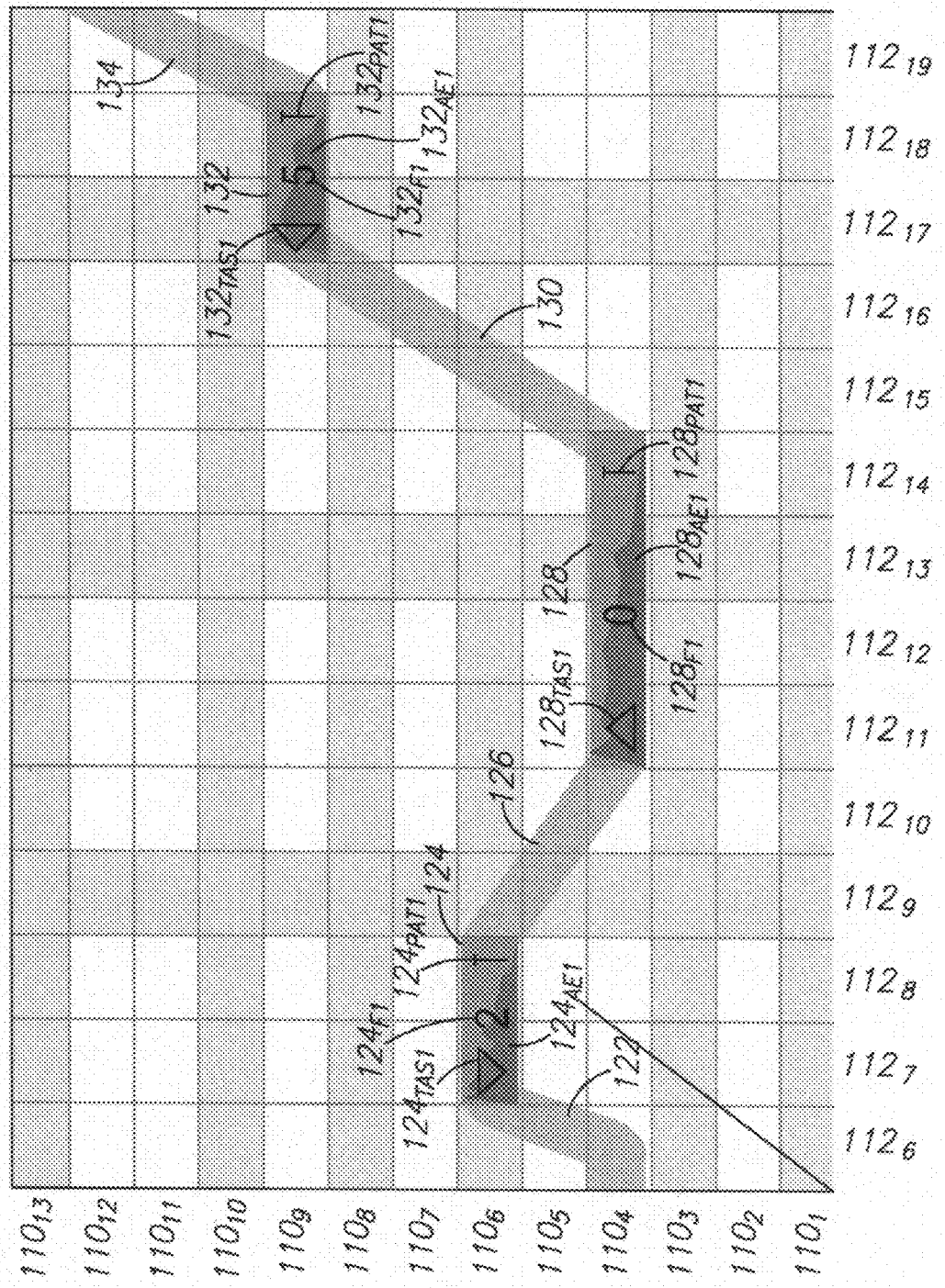
FIG. 3A is a schematic illustration of GUI 100, showing a magnification of the first three note representations and their interlinking paths from Group 1 of FIG. 2, constructed and operative in accordance with another embodiment of the disclosed technique.
Figure 3B:
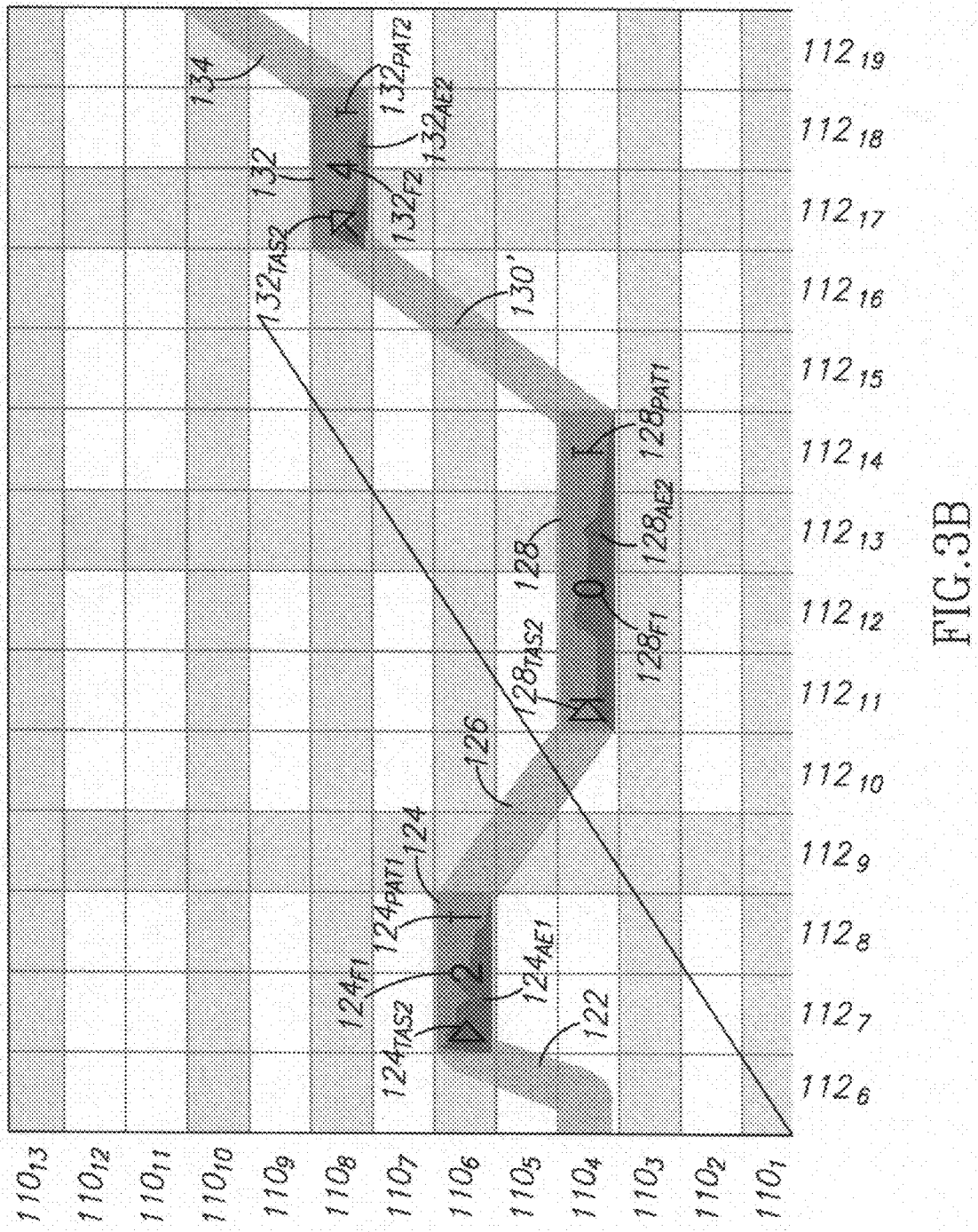
FIG. 3B is a schematic illustration of FIG. 3A, wherein the attributes of the note representations have been modified, constructed and operative in accordance with a further embodiment of the disclosed technique.

Reference is now made to FIGS. 3A and 3B. FIG. 3A is a schematic illustration of the GUI of FIG. 2, showing a magnification of the first three note representations and their interlinking paths from Group 1 of FIG. 2, constructed and operative in accordance with another embodiment of the disclosed technique. FIG. 3B is a schematic illustration of the GUI of FIG. 3A, wherein the attributes of the note representations have been modified, constructed and operative in accordance with a further embodiment of the disclosed technique.

The first three note representations of Group 1 include note representations 124, 128, and 132 (FIG. 2). Each of the three note representations is represented by a rectangle of a characteristic length, and superimposed on grid 106 (FIG. 2) at a row corresponding to a specific pitch. Each of the note representations includes a timbre attribute symbol, a fret number, an amplitude envelope and a peak amplitude tab. Note representation 124 includes a timbre attribute symbol $124_{TAS1}$, a fret number $124_{F1}$, an amplitude envelope $124_{AE1}$, and a peak amplitude tab $124_{PAT1}$. Note representation 128 includes a timbre attribute symbol $128_{TAS1}$, a fret number $128_{F1}$, an amplitude envelope $128_{AE1}$ and a peak amplitude tab $128_{PAT1}$. Note representation 132 includes a timbre attribute symbol $132_{TAS1}$, a fret number $132_{F1}$, an amplitude envelope $132_{AE1}$ and a peak amplitude tab $132_{PAT1}$.

Timbre attribute symbol represents the timbre of a note substantially during the note initiation period, (e.g., the articulation or picking pattern employed in the picking of a string of a string instrument). The timbre attribute symbol associated with a particular note representation represents the timbre characteristics associated with the play of the note (i.e., associated with its respective note representation) on a respective string. For example, a guitarist playing on an electric guitar employs different picking patterns, which can produce different sounds. Moreover, the timbre attribute symbol can also denote articulation with regards to transitions from one note to the next note, and playing manner of particular notes (e.g., legato, staccato and crescendo). Timbre attribute symbol $124_{TAS1}$, of note representation 124 is in the shape of a pointing-down triangle ▼, which represents a pick-down picking pattern, employed in playing the note represented by note representation 124.

Timbre attribute symbol $128_{TAS1}$ of note representation 128 is in the shape of pointing-up triangle ▲, which represents a pick-up picking pattern employed in playing the note represented by note representation 128. Timbre attribute symbol $132_{TAS1}$, of note representation 132 is in the shape of a left-pointing triangle ◀, which represents a slap picking pattern, employed in playing the note represented by note representation 132. A myriad of other timbre attribute symbols can be employed to designate various other picking patterns, picking patterns facilitated by the fretting hand (typically the left hand) and by the plucking hand (typically the right hand).

For example, the timbre attribute symbol can designate a pop ▶a hammer-on ◀a pull-off ▶a tapping hammer-on ◀, a tapping pull-off ▶a slide-up ↗, a slide-down ↘, a plucking slide-up ↗, and a plucking slide-down ↘. It is noted that a pull-off is typically performed by the fretting hand, and a tapping pull-off is typically performed by the picking hand, both of which are identical in terms of timbre, yet not in terms of articulation, and therefore, are represented differently by the timbre attribute symbol. Furthermore, the time-variable timbre attributes can be displayed by timbre attribute symbol, such as fret-buzz, overtone, and the like. A time-variable timbre attribute, associated with a note, is an attribute related to timbre, which varies substantially throughout the duration of the note, as opposed to only substantially during note initiation (e.g., hammer-on, pull-off).

The timbre attributes of the note representations are stored in a memory (not shown) of a system (not shown) incorporating GUI 100. The user of GUI 100 can alter (i.e., modify, change) the timbre attribute symbol designation of a particular note representation or a selection of note representations. For example, the user can alter the timbre attribute symbol designation of a particular note representation from a hammer-on tap to a right-handed pull-off tap (not shown). The sound represented by the note corresponding to the altered note representation will possess a timbre which is characteristic to a right-handed pull-off tap, despite the fact that the timbre of the note prior to the aforementioned alteration was characteristic to a hammer-on tap. In other words, the timbre characteristics of the respective graphically encoded note representations are modifiable.

It is noted that all timbre attribute changes are allowed. With reference to FIG. 3B, timbre attribute symbol $124_{TAS1}$ (FIG. 3A) of note representation 124, which illustrates a pick-down symbol ▼ is changed to timbre attribute symbol $124_{TAS2}$ (FIG. 3B), illustrating a pop symbol ▶. This indicates that the picking pattern employed to play the note, depicted by note representation 124, is changed from pick-down to pop. Timbre attribute symbol $128_{TAS1}$ (FIG. 3A) of note representation 128, illustrating a pick-up symbol ▲ is changed to timbre attribute symbol $128_{TAS2}$ (FIG. 3B), which illustrates by a tapping pull-off symbol ▶. This indicates that the picking pattern employed to play the note, depicted by note representation 128, is changed from pick-up to tapping pull-off.

Timbre attribute symbol $132_{TAS1}$ (FIG. 3A) of note representation 132, illustrating a slap symbol ◀ is changed to timbre attribute symbol $132_{TAS2}$ (FIG. 3B), which illustrates a slide-up symbol ↗ This indicates that the picking pattern employed to play the note, depicted by note representation 132, is changed from slap to slide-up. Therefore, a change to the timbre attribute symbol, correspondingly changes the respective timbre characteristics associated with the respective one of the graphically encoded note representations (i.e., according to the change).

The fret number represents the number of the fret employed to play a note on a string of the string instrument. The fret number represents an identifier that identifies the fret of the stringed musical instrument that is used to play a particular note on the respective string of the stringed musical instrument. With reference to FIG. 3A, fret number $124_{F1}$ of note representation 124, is 2, which indicates that the note is played on the second fret. Fret number $128_{F1}$ of note representation 128, is 0, which indicates that the note is played on an open string (i.e., without fretting). Fret number $132_{F1}$ of representation 132, is 5, which indicates that the note is played on the fifth fret. The user of GUI 100 can alter the fret number of a particular note representation or a selection of note representations. Therefore, a change to the fret number of a selected one of the note representations, correspondingly changes the timbre characteristics associated with the selected one.

With reference to FIG. 3B, fret number $132_{F1}$ (FIG. 3A) of note representation 132, is changed to fret number $132_{F2}$ (FIG. 3B), the latter indicating a fret number of 4. Consequently, note representation 132 is shifted down one semitone, indicated by a downward vertical repositioning of note representation 132 to row $110_8$. It is noted that path 130 (FIG. 3A) is thence shortened to compensate for the decreased distance between note representations 128 and 132 and is now denoted path 130' (FIG. 3B). Furthermore, each of the note representations is associated with respective timbre characteristics. When a change (i.e., modification) occurs (e.g., via user input) to the fret number of a particular note representation, the corresponding timbre characteristics, associated with that respective note representation can also change accordingly.

The amplitude envelope is a 2-D unipolar representation of an approximate variation of the amplitude of a sound waveform (not shown) of a particular note in time. The sound waveform is associated with a respective note (i.e., being respective of a particular note representation) that is played on the respective string of the stringed musical instrument. Alternatively, amplitude envelope is a 2-D bipolar representation thereof. With reference to FIG. 3A, amplitude envelope $124_{AE1}$ illustrates an approximate variation of the amplitude in time, of a sound waveform (not shown) corresponding to note representation 124. Similarly, amplitude envelopes $128_{AE1}$ and $132_{AE1}$ each illustrate an approximate variation of the amplitude in time, of a sound waveforms (not shown) corresponding to note representation 128 and 132, respectively.

The user of GUI 100 can manipulate amplitude envelope of a particular note representation or a selection of note representations. With reference to FIG. 3B, amplitude envelope $128_{AE1}$ (FIG. 3A) is modified in a manner that attenuates the amplitude of the waveform represented by note representation 128, at substantially the beginning third of the duration of the note, denoted by amplitude envelope $128_{AE2}$ (FIG. 3B).

The peak amplitude tab is a vertical graphical indicator of the maximum amplitude of the sound waveform of a given note (i.e., respective of a particular note representation). It is noted that the peak amplitude tab can also be referred to a peak amplitude indicator, a graphical indicator of the peak amplitude, and the like. With reference to FIG. 3A, peak amplitude tab $124_{PAT1}$, represents the peak amplitude reached by the sound waveform corresponding to the note represented by note representation 124. Peak amplitude tab $128_{PAT1}$, represents the peak amplitude reached by the sound waveform corresponding to the note represented by note representation 128, and peak amplitude tab $132_{PAT1}$, represents the peak amplitude reached by the sound waveform corresponding to the note represented by note representation 132.

Peak amplitude tab is an interactive control, which enables a user to alter the peak amplitude of a sound waveform of a given note, thereby varying the volume of that note (e.g., analogous to a volume fader). An alteration of the peak amplitude tab of a note representation alters the amplitude envelope of that note representation correspondingly. For example, the user may attenuate, clip, and intensify peak amplitude of the note corresponding to a note representation. Therefore, a change to amplitude indicator correspondingly changes the respective maximum value of the amplitude of the respective sound waveform (i.e., respective of the particular note representation).

With reference to FIG. 3B, peak amplitude tab $132_{PAT2}$ is vertically lowered by the user, in comparison with peak amplitude tab $132_{PAT1}$ (FIG. 3A), which corresponds to the limitation of the volume of the played note, designated by note representation 132. Amplitude envelope $132_{AE1}$ (FIG. 3A) is modified to amplitude envelope $132_{AE2}$ (FIG. 3B) in such a manner that it attenuates the amplitude of the waveform represented by note representation 132.

It is noted that when the length of a particular note representation is too short to contain all of the inner note representation symbols (i.e., timbre attribute symbol, fret number and peak amplitude tab), GUI 100 employs a prioritization scheme to determine which of the inner note representation symbols has highest priority to be displayed. Such cases are especially apparent when the duration of a note corresponding to the length of the note representation is short (e.g., note representation 172 (FIG. 2). Typically, the inner note representations of highest display priority are the fret number and timbre attribute symbol. Alternatively, the user can alter the prioritization scheme.

Figure 4A:
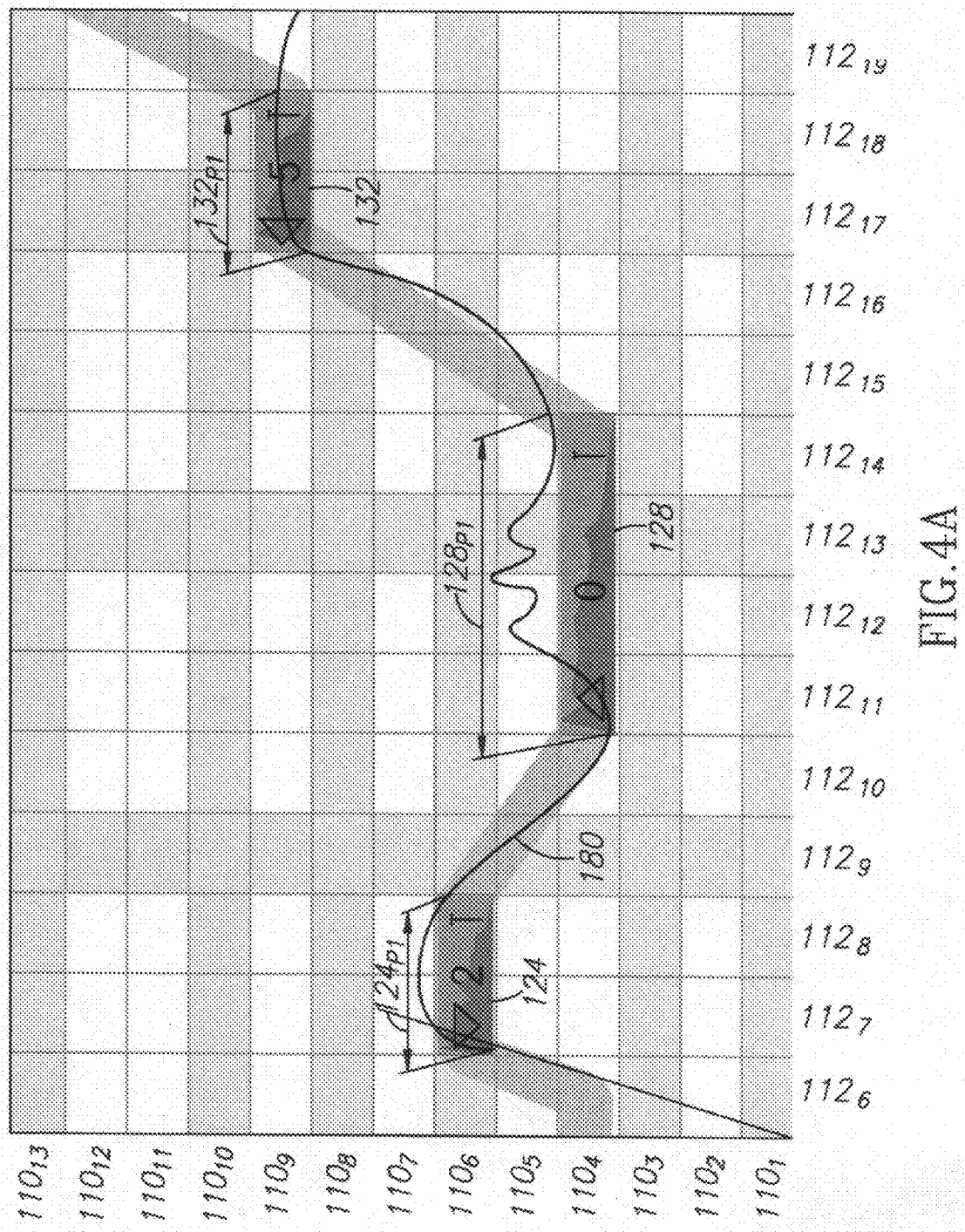
FIG. 4A is a schematic illustration of GUI 100, showing a magnification of the first three note representations from Group 1 of FIG. 2 and their interlinking paths including a pitch envelope, constructed and operative in accordance with another embodiment of the disclosed technique.

Reference is now made to FIGS. 4A and 4B. FIG. 4A is a schematic illustration of the GUI of FIG. 2, showing a magnification of the first three note representations from Group 1 of FIG. 2 and their interlinking paths including a pitch envelope, constructed and operative in accordance with another embodiment of the disclosed technique. FIG. 4B is a schematic illustration of FIG. 4A, wherein the pitch envelope has been modified, constructed and operative in accordance with a further embodiment of the disclosed technique.

FIG. 4A illustrates three note representations 124, 128, and 132 of Group 1 (i.e., similar to FIG. 3A) and pitch envelope 146. Pitch envelope 180 is a representation of a variation of the dominant pitch (i.e., dominant frequency of frequencies) in time of the sound generated by the first string of string instrument. GUI 100 can display a pitch envelope corresponding to the other groups of note representations (e.g., Group 2). Pitch envelope 180 is represented by a continuous line substantially following the succession of note representations 124, 128, and 132.

Alternatively, pitch envelope 180 can be represented by a discontinuous line. Pitch envelope 180 can be color-coded to match the color-coding scheme employed by Group 1 of note representations. A pitch envelope of a particular note representation is that part of the pitch envelope, that possesses substantially the same horizontal extend corresponding to that note representation. The pitch envelopes corresponding to note representations 124, 128, and 132, are $124_{P1}$, $128_{P1}$, and $132_{P1}$, respectively. The pitch envelope of a note representation can transverse two or more rows, corresponding to a variation of pitch of more than one semitone (e.g., a vibrato of a note—wobbling of the pitch).

Pitch envelope $128_{P1}$, corresponding to note representation 128 extends beyond the confines of one row (i.e., row $110_6$); this signifies a variation in pitch of more than one semitone, while the note corresponding to note representation 124 is being played. Pitch envelope $132_{P1}$ is approximately flat, which signifies substantially no variation of pitch while the note corresponding to note representation 132 is being played.

The user of GUI 100 can manipulate pitch envelope 180, segments of pitch envelope 180, and the pitch envelope corresponding to a particular note representation. With reference to FIG. 4B, modified pitch envelope 180' is modified in comparison with pitch envelope 180 (FIG. 4A). Specifically, pitch envelope $128_{P1}$ (FIG. 4A) is modified to pitch envelope $128_{P2}$ (FIG. 4B) in order to reduce the fluctuations in pitch (i.e., to smooth) of the note corresponding to note representation 128. Pitch envelope $124_{P1}$ (FIG. 4A) is modified to pitch envelope $124_{P2}$ (FIG. 4B) in order to make it flat (i.e., substantially no variation in pitch). Pitch envelope $132_{P1}$ (FIG. 4A) is transformed from a flat decreasing sine, to an exponential decreasing sine, by applying known mathematical formulas and is now pitch envelope $132_{P2}$ (FIG. 4B). Therefore, a change to the pitch envelope correspondingly changes the respective variation of the substantially dominant pitch of the respective sound waveform in time (i.e., of the respective note representation). It is noted that at least two successive pitch envelopes of respective note representations are connected together.

Figure 5:
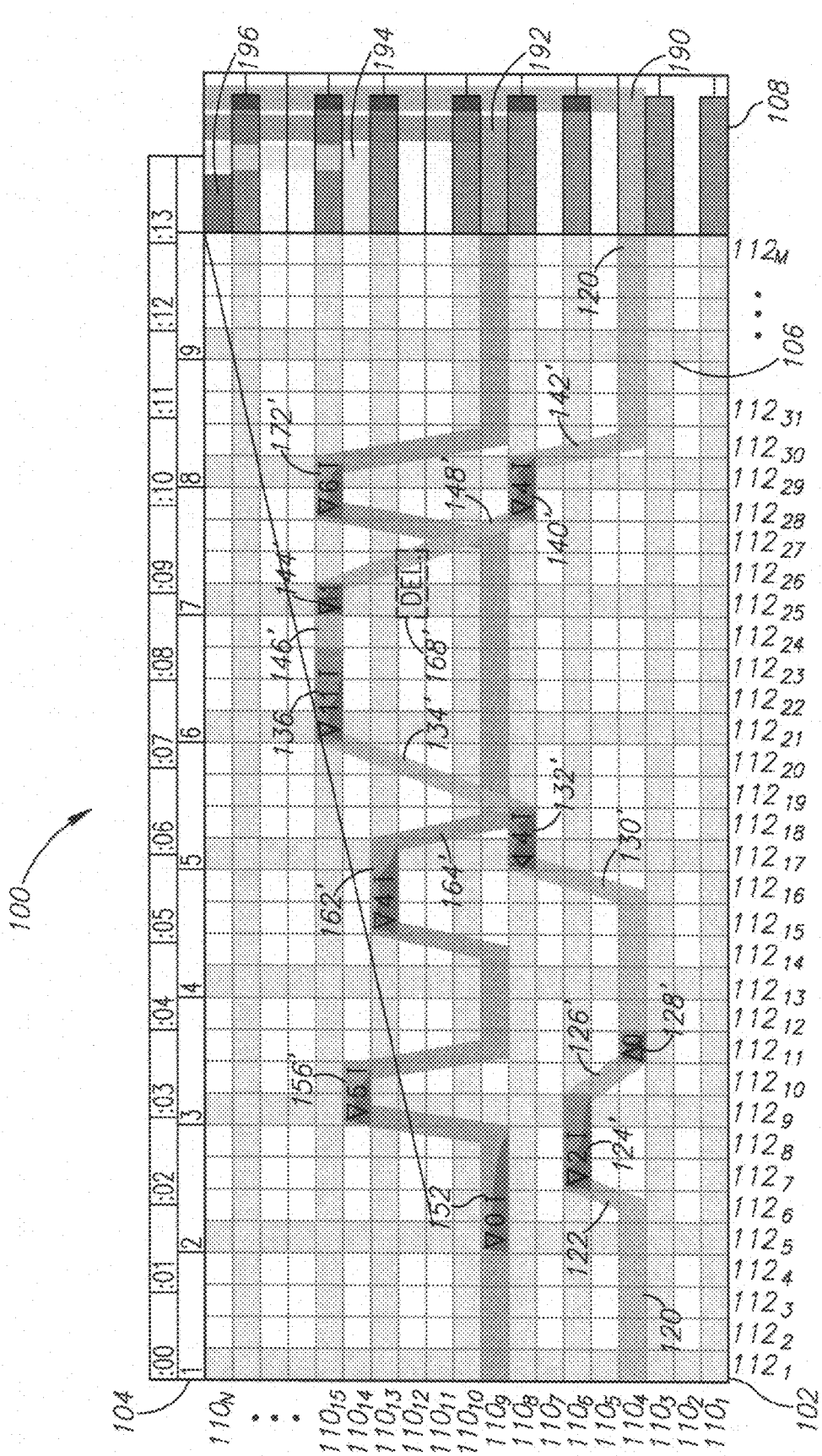
FIG. 5, which is a schematic illustration of GUI 100 of FIG. 2, wherein the note representations have been modified, constructed and operative in accordance with another embodiment of the disclosed technique.

Reference is now made to FIG. 5, which is a schematic illustration of the GUI of FIG. 2, wherein the note representations have been modified, constructed and operative in accordance with another embodiment of the disclosed technique. GUI 100 includes two groups of note representations 1' and 2' (hereinafter, Group 1' and Group 2', respectively) similar to Groups 1 and 2 of FIG. 2. Group 1' includes six note representations, one of which is the same note representation as in FIG. 2, four of which are modified with respect to note representations in FIG. 2, and one of which is a newly added note representation with respect to FIG. 2. Note representation 136 is the same as in FIG. 2.

Modified note representations 124', 128', 132' and 140' are modified with respect to note representations 124, 128, 132, and 140 (FIG. 2), respectively. Note representation 144' is a newly added note representation with respect to FIG. 2. Group 2' includes four note representations, one of which is the same note representation as in FIG. 2, and three of which are modified with respect to note representations in FIG. 2. Note representation 152 is the same note representation as in FIG. 2.

Modified note representations 156', 162', and 172' are modified with respect to note representations 156, 162, and 172 (FIG. 2), respectively. It is noted that note representation 168 (FIG. 2) is deleted in FIG. 5 and is represented by a dashed line rectangle with the inscription "DEL." therein, denoted by deleted note representation 168'.

The user of GUI 100 can modify the length of a note representation, which corresponds to modifying the duration of a note. The duration of any note selected by the user can be shortened or lengthened. When a note representation is modified, the paths that interconnect the note representation are adapted to compensate for a longer or shorter note representation and for the varied distance there between. Therefore, when there is a change to a particular note representation (e.g., its dimension, such as its length, corresponding to duration, its position in grid 106), the paths that are connected to that particular note representation also change (e.g., position-wise, dimension-wise, shape-wise), correspondingly.

Group 1' further includes three modified paths which are modified with respect to the corresponding paths illustrated in FIG. 2, one path which is the same as its corresponding path in FIG. 2, and one new path. Modified path 126', modified path 130', modified path 134', and modified open-string path 142', are all modified with respect to paths 126, 130, 134, and open-string path 142 (FIG. 2), respectively. Furthermore, path 122 is the same as in FIG. 2, and two new paths indicated by the designations path 146' and 148'. All of the aforementioned paths belonging to Group 1' are color-coded blue. Modified path 126' links modified note representations 124' and 128', modified path 130' links modified note representations 128' and 132 through open-sting path 120, and modified path 134' links modified note representation 132' and note representation 136.

Path 146' links note representation 136 and note representation 144'. Path 148' links note representation 144' and note representation 140' and modified path 142' links modified note representation 140' with open-string path 120, the latter is the same as open-string path 120 aforementioned with reference to FIG. 2.

FIG. 5 illustrates that the duration of the note corresponding to the length of modified note representation 124' is lengthened by one beat (i.e., with respect to note representation 124 of FIG. 2), and is now three beats in duration. Modified note representation 124' now occupies columns $112_7$, $112_8$ and $112_9$ of row $110_6$. Modified path 126', which interconnects modified note representation 124' with modified note representation 128', is shortened with respect to path 124 (FIG. 2). Alternatively, the user can lengthen the duration of any note, by lengthening the note representation corresponding to it.

The user can shorten the duration of any note, by shortening the note representation associated therewith. The duration of the note, corresponding to the length of note representation 128' is shortened by three beats (i.e., with respect to note representation 128 of FIG. 2), and is now one beat in duration and occupies column $112_{11}$ of row $110_4$. The duration of the note, corresponding to the length of modified note representation 162' is shortened by one beat (i.e., with respect to note representation 162 of FIG. 2), and is now three beats in duration and occupies columns $112_{15}$, $112_{16}$ and $112_{17}$ of row $110_{13}$.

The user of GUI 100 can modify the pitch of any note representation or any selection of notes. The pitch of a note can be transposed up by a user employing GUI 100. For example, the pitch of the note corresponding to the vertical position of modified note representation 156' is transposed up by two semitones (i.e., with respect to note representation 156 of FIG. 2), and is now in row $110_{14}$, corresponding to the note D. Alternatively, the user can transpose up the pitch of any note or selection of notes. The pitch of a note can also be transposed down by the user of GUI 100. The pitch of the note corresponding to the vertical position of modified note representation 132' is transposed down by one semitone (i.e., with respect to note representation 132 of FIG. 2), and is now in row $110_8$, corresponding to the note A$^{\flat}$.

Alternatively, the user can transpose down the pitch of any note or selection of notes. It is noted that a pitch-wise change to a note does not alter the timbre characteristics associated with the note, (i.e., pitch modification of a note is independent of the timbre characteristics of the note).

The user of GUI 100 can successively apply different modifications to a particular note representation or a selection of note representations. Modified note representation 162' is modified by applying two different modifications in a successive manner. The duration of the note corresponding to modified note representation 162' is shortened by one beat. Additionally, the pitch of the note corresponding to the vertical position of modified note representation 162' is transposed up by one semitone (i.e., with respect to note representation 162 of FIG. 2). Therefore, a change to the vertical position of a note representation, changes its respective tonal characteristics. Alternatively, GUI 100 can simultaneously apply any number of different modifications to a note representation or a selection of note representations.

The user of GUI 100 can delete, cut and paste, copy and paste, move (i.e., shift or relocate) and add new note representations. Note representation 168 (FIG. 2) is deleted (see FIG. 5), represented by a dashed line rectangle and the inscription "DEL." therein, and denoted by deleted note representation 168' and is absent from columns $112_{25}$ and $112_{26}$ of row $110_{12}$. Alternatively, the user can delete any other note representation or selection of note representations. Note representation 144' is newly added (FIG. 5) to the musical piece, displayed by GUI 100. Note representation 144' now occupies column $112_{25}$ of row $110_{15}$, corresponding to the note C$^{\sharp}$, and is one beat in duration.

Alternatively, the user can add new note representations to the musical piece. Modified note representation 172' is moved right by one beat and also transposed upward by two semitones, thereby occupying columns $112_{28}$ and $112_{29}$ of row $110_{15}$. The length of modified note representation 140' is shortened by two beats and shifted left by two beats, thereby occupying columns $112_{28}$ and $112_{29}$ of row $110_8$.

Paths that interconnect modified, newly added or deleted note representations are adapted correspondingly. For example, path 166 (FIG. 2), which interconnects open-string path 150 and note representation 168 is deleted in FIG. 5, as a result of the deletion of note representation 168 (FIG. 2). Path 146' is a newly added path that interconnects note representation 136, and newly added note representation 144'. Furthermore, modified path 126' is shortened in comparison to path 126 (FIG. 2) to compensate for lengthened note representation 124'. Therefore, note transitions that previously connected to a deleted note representation, interconnect. Hence, a change to particular note representation in at least one position and dimension, correspondingly changes the note transitions that are adjacent to that particular note representation. Furthermore, a change to particular note representation (i.e., of a particular note group) in at least one position and dimension, respectively changes the paths of that particular note group.

It is noted the prioritization scheme related to the overlap of paths has been reversed by the user of GUI 100 in FIG. 5 (relative to that employed in FIG. 2). For example, modified path 134' of Group 1' (FIG. 5) and related to a low string, has a higher priority number than modified path 164' of Group 2' (FIG. 5), and related to a high string therefore, modified path 134' is superimposed on modified path 164', at their mutual area of overlap.

Therefore GUI each of the note representations is modifiable according to at least one modifiable characteristic. Modifiable characteristics include pitch, amplitude, timbre, duration, timing, sound effects (i.e., addition thereof), relocation in grid 106, graphical encoding, insertion of a note representation, and deletion thereof.

Figure 6:
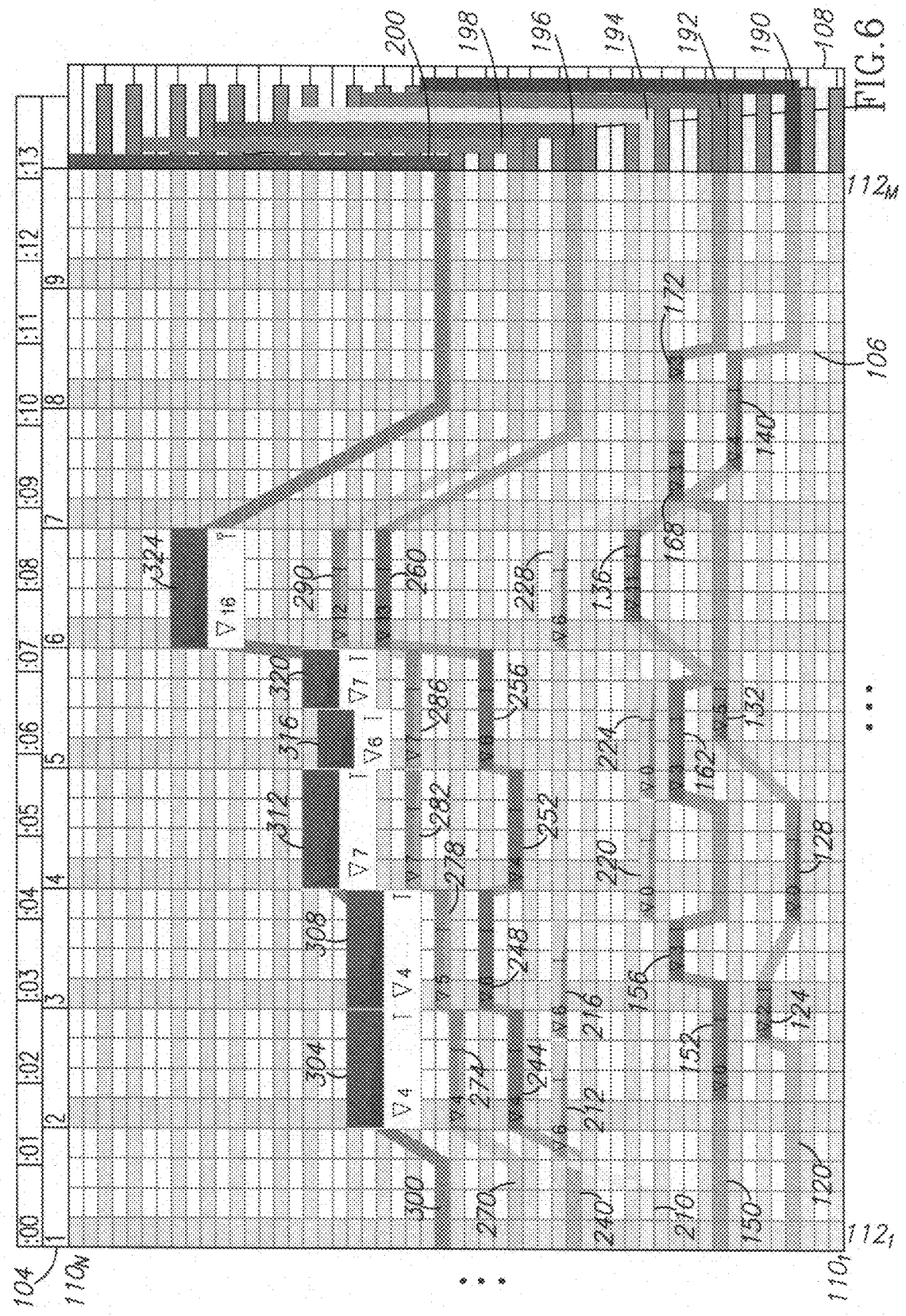
FIG. 6 is a schematic illustration of a GUI, generally referenced 100, including six groups of note representations constructed and operative in accordance with a further embodiment of the disclosed technique.

Reference is now made to FIG. 6 is a schematic illustration of the GUI of FIG. 2, including six groups of note representations constructed and operative in accordance with a further embodiment of the disclosed technique. GUI 100 includes six groups of note representations, corresponding to a string instrument possessing six strings. Each group of the note representations is color-coded and represents a group of notes that are played from a specific string of the string instrument. Group 1 of the note representations represents a group of notes that are played from a first string of the string instrument (i.e., same as in FIG. 2). Group 2 of the note representations represents a group of notes that are played from a second string of the string instrument (i.e., same as in FIG. 2).

Group 3 of the note representations (hereinafter "Group 3") represents a group of notes that are played from a third string of the string instrument. Group 4 of the note representations (hereinafter "Group 4") represents a group of notes that are played from a fourth string of the string instrument. Group 5 of the note representations (hereinafter "Group 5") represents a group of notes that are played from a fifth string of the string instrument, and group 6 of note representations (hereinafter "Group 6") represents a group of notes that are played from a sixth string of the string instrument.

Group 1 includes open-string path 120 and five note representations 124, 128, 132, 136 and 140 (i.e., as in FIG. 2). Group 2 includes open-string path 150 and five note representations 152, 156, 162, 168 and 172 (i.e., as in FIG. 2). Group 3 includes an open-string path 210 and five note representations 212, 216, 220, 224 and 228 Group 4 includes an open-string path 240 and five note representations 244, 248, 252, 256, and 260. Group 5 includes an open-string path 270 and five note representations 274, 278, 282, 286 and 290 and Group 6 includes an open-string path 300 and six note representations 304, 308, 312, 316, 320 and 324. GUI 100 further includes six color-coded string-range indicators, each of which represent the playing range of a particular string, belonging to a string instrument (not shown).

FIG. 6 illustrates six string-range indicators 190, 192, 194, 196, 198, and 200. String-range indicator 190 is color-coded blue and represents the playing range of the first string of the string instrument, which spans from E1 to E3 (i.e., two octaves). String-range indicator 192 is color-coded red and represents the playing range of the second string of the string instrument, which spans from A2 to A4. String-range indicator 194 is color-coded yellow and represents the playing range of the third string of the string instrument, which spans from D2 to D4. String-range indicator 196 is color-coded green and represents the playing range of the fourth string of the string instrument, which spans from G2 to G4. String-range indicator 198 is color-coded orange and represents the playing range of the fifth string of the string instrument, which spans from B2 to B4. String-range indicator 200 is color-coded purple and represents the playing range of the sixth string of the string instrument, which spans from E3 to E5. It is noted that the user of GUI 100 can select to zoom on a particular note representation or a particular group of note representations. For example, FIG. 6 illustrates that Group 6 is magnified (i.e., note representations 304, 308, 312, 316, 320 and 324 are vertically enlarged), thereby displaying magnifications of the inner note representation information (e.g., the amplitude envelope, time-variable timbre attributes) of each corresponding note representation.

GUI 100 of FIG. 6 is operative in a manner substantially similar to the description aforementioned with reference to FIG. 2, while bearing the particularities imparted with reference to FIG. 6. While FIG. 6 along with the corresponding description show the case of a string instrument possessing six strings, it is noted that the disclosed technique is applicable to string instruments possessing various other numbers of strings.

Figure 7A:
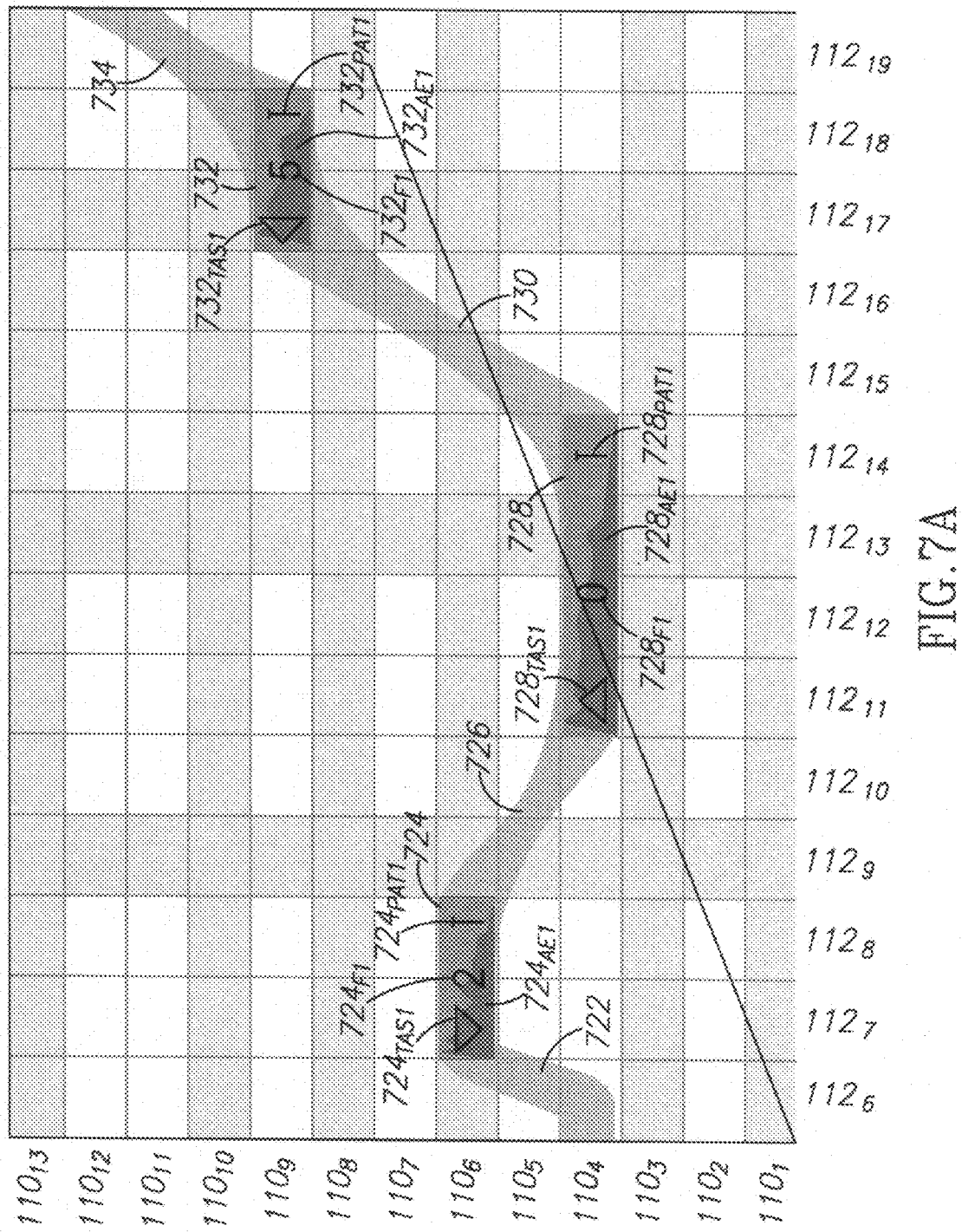
FIG. 7A is a schematic illustration of GUI 100, showing a magnification of the first three note representations from Group 1 of FIG. 2, similar to those illustrated in FIG. 3A, and warped paths interlinking therebetween, constructed and operative in accordance with another embodiment of the disclosed technique.
Figure 7B:
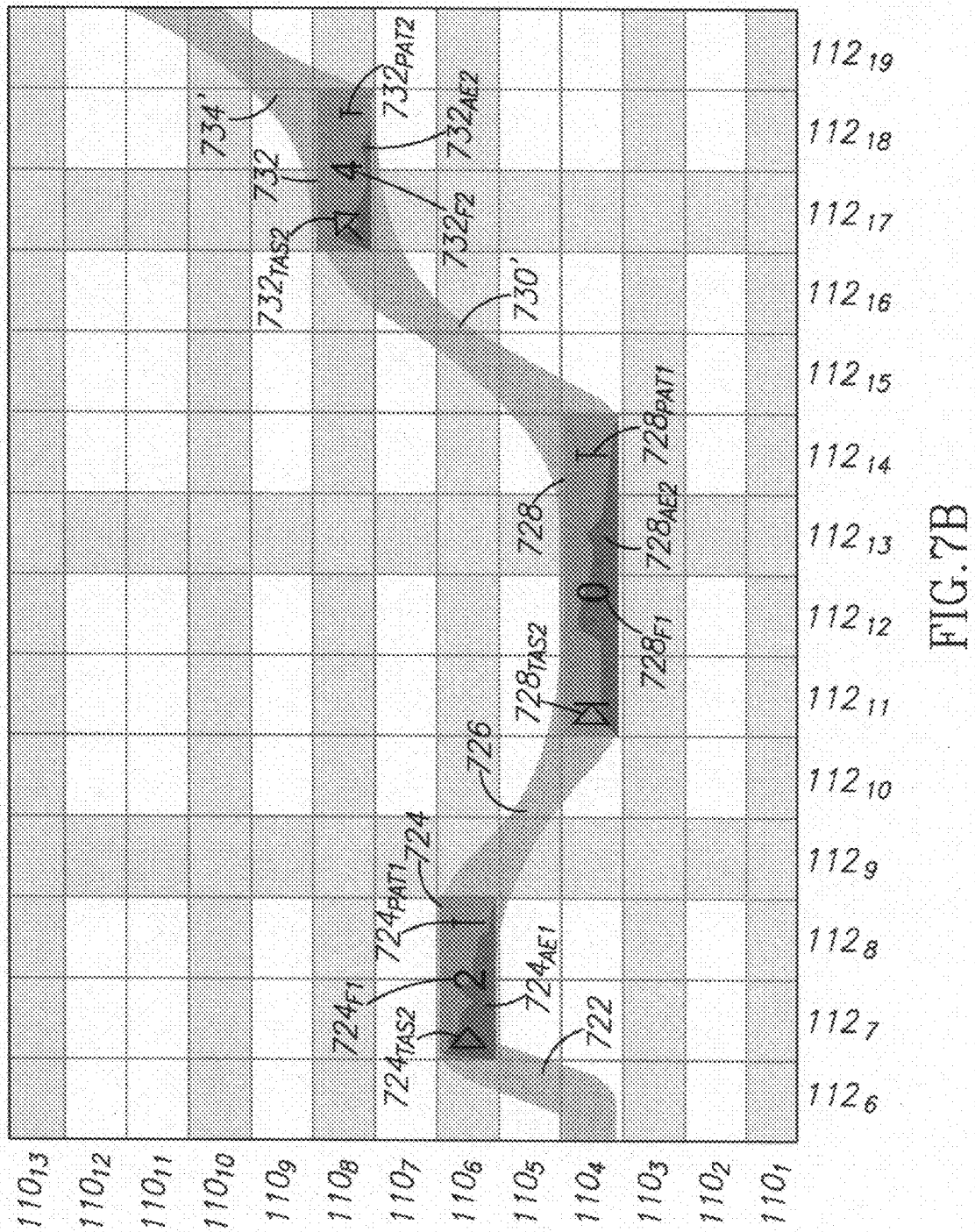
FIG. 7B is a schematic illustration of GUI 100, showing a magnification of the first three note representations from Group 1 of FIG. 2, similar to those illustrated in FIG. 3B, and warped paths interlinking therebetween, constructed and operative in accordance with a further embodiment of the disclosed technique.

Reference is now made to FIGS. 7A and 7B. FIG. 7A is a schematic illustration of the GUI of FIG. 2, showing a magnification of the first three note representations from Group 1 of FIG. 2, similar to those illustrated in FIG. 3A, and warped paths interlinking therebetween, constructed and operative in accordance with another embodiment of the disclosed technique. FIG. 7B is a schematic illustration of GUI 100, showing a magnification of the first three note representations from Group 1 of FIG. 2, similar to those illustrated in FIG. 3B, and warped paths interlinking therebetween, constructed and operative in accordance with a further embodiment of the disclosed technique.

FIGS. 7A and 7B are similar to FIGS. 3A and 3B, respectively, however, they differ substantially in the representation of the paths that interlink between note representations. With reference to FIG. 7A, GUI 100 includes three note representations 724, 728 and 732, identical to note representations 124, 128 and 132 of FIG. 3A, respectively. GUI 100 further includes one path 722 and three warped paths 726, 730 and 734. Path 722, identical with path 122 of FIG. 3A, interlinks between open-string path and note representation 724. Warped path 726, substantially different in comparison with path 126 (FIG. 3A), interlinks between note representations 724 and 728. Warped path 730, also substantially different in comparison with path 130 (FIG. 3A), interlinks between note representations 728 and 732. Furthermore, warped path 734, which is substantially different in comparison to path 132 (FIG. 3A), interlinks between note representations 732 and the succeeding note representation (not shown).

Each of warped paths (i.e., graphically encoded note transitions are graphically encoded according to a graphical code (e.g., color coding, shape, different visualizations). The contour (i.e., outline) of warped paths 726, 730 and 734 are different from that of paths 126, 130 and 134, respectively of FIG. 3A. Warped paths 726, 730 and 734 are warped in a manner that provides a highlighted visualization of the transitions that transpires between note representations, in a respective note group. Alternatively, warped paths 726, 730 and 734 can further incorporate animations (not shown) thereof (i.e., blinking techniques, highlighting of the contour with different colors, flickering of the paths that originate from a particular group of note representations). Additionally, the warped paths can include information displayed therein (not shown), such as information relating to the sound corresponding to the preceding note representation, information pertaining to the stringed musical instrument composition, and the like.

Furthermore, information illustrated within the warped paths, for example, information relating to a group of note representations that are selected by the user, can be displayed within a pop-up window. The user can collectively modify various sound attributed to the selection of the note representations (e.g., collectively lowering volume, collectively triggering a spectral analysis of each of the notes corresponding to the selected note representations), and display the information within the warped paths that interconnect there between.

With further reference to FIG. 7B, user interface 100 further includes two modified warped paths 730' and 734'. Modified warped path 730' interlinks between note representation 728 and note representation 732. Modified warped path 734' interlinks between note representation 732 and the succeeding note representation (not shown). Modified warped path 730' is modified with respect to warped path 730 (FIG. 7A) and modified path 732' is modified with respect to warped path 732 (FIG. 7A), to compensate for the lowering by one semitone of note representation 732 (FIG. 7B, with respect to FIG. 7A). The upper part of the contour of modified warped path 730' is more curved as a result of the decreased distance between note representations 728 and 732 and provides a more highlighted visualization of the modification, accordingly.

Figure 8:
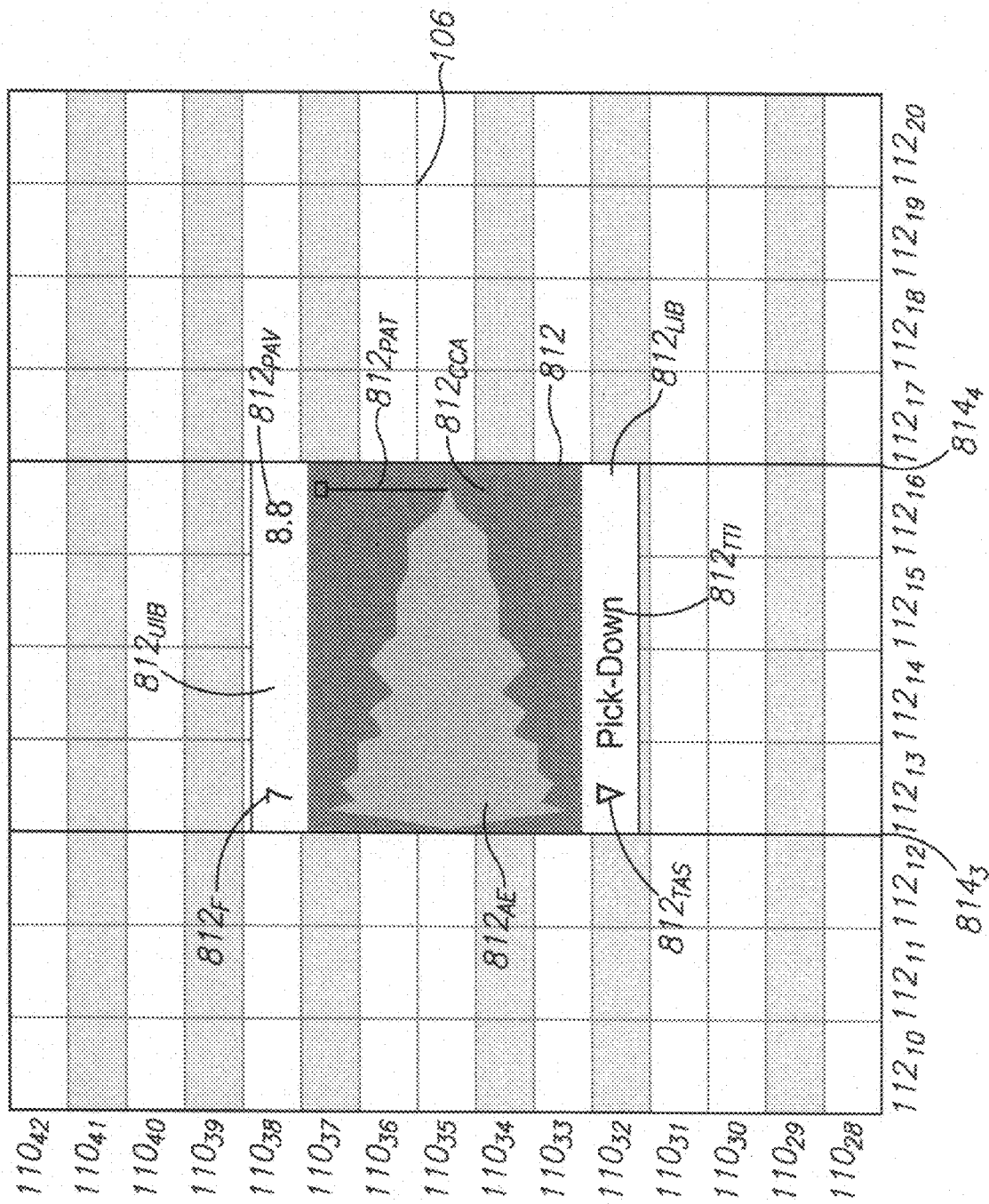
FIG. 8 is a schematic illustration of GUI 100, showing a magnification of a note representation incorporating a variant representation scheme thereof, constructed and operative in accordance with another embodiment of the disclosed technique.

Reference is now made to FIG. 8, which is a schematic illustration of the GUI of FIG. 2, showing a magnification of a note representation incorporating a variant representation scheme thereof, constructed and operative in accordance with another embodiment of the disclosed technique. GUI 100 includes a note representation 812, analogous to note representation 312 of FIG. 6, grid 106 and bar lines 814$_3$ and 814$_4$ (i.e., including textual data). Note representation 812 includes inner note representation information which, in turn, includes a color-coded area 812$_{CCA}$, an amplitude envelope 812$_{AE}$, a fret number 812$_F$, a peak amplitude tab 812$_{PAT}$, a timbre attribute symbol 812$_{TAS}$, a timbre textual information 812$_{TTI}$, a peak amplitude value 812$_{PAV}$, an upper information bar 812$_{UIB}$, and a lower information bar 812$_{LIB}$.

GUI 100 superimposes note representation 812 on grid 106 according to pitch and timing, consistent with the method employed in connection with the previous figures, as described hereinabove. The user of GUI 100 selects to zoom on a particular note representation (e.g., note representation 812, analogous with note representation 312 of FIG. 6). Note representation 812 is vertically enlarged, thereby displaying the inner note representation information therein. Note representation 812 is positioned between columns 112$_{12}$ and 112$_{17}$, and further between bar lines 814$_3$ and 814$_4$, corresponding to a note duration equivalent to four beats. Each bar line represents the beginning of a succeeding measure and also the end of a preceding measure. Consequently, the space between every two adjacent bar lines defines one measure. Hence, note representation 812 is one measure in duration.

Upper information bar 812$_{UIB}$ extends along the upper horizontal length of note representation 812 and possesses a width substantially equivalent to one row. Similarly, lower information bar 814$_{LIB}$ extends along the lower horizontal length of note representation 812 and possesses a width substantially equivalent to one row. GUI 100 superimposes fret number 812$_F$ and peak amplitude value 812$_{PAV}$ on upper information bar 812$_{UIB}$, and timbre attribute symbol 812$_{TAS}$ and timbre textual information 812$_{TTI}$ on lower information bar 812$_{UIB}$. Situated between upper information bar 812$_{UIB}$ and lower information bar 812$_{uB}$ is amplitude envelope 812$_{AE}$ and peak amplitude tab 812$_{PAT}$ which, in turn, are superimposed on color-coded area 812$_{CCA}$ of note representation 812.

Fret number 812$_F$ represents the number of the fret employed to play a note, corresponding to note representation 812, on the musical instrument. Peak amplitude tab 812$_{PAT}$ is a vertical graphical indicator of the maximum amplitude of the sound waveform of the note, corresponding to note representation 812. Timbre attribute symbol 812$_{TAS}$ represents the timbre of a note, corresponding to note representation 812, substantially during the note initiation period. Peak amplitude value 812$_{PAV}$ represents the value of the maximum amplitude reached by the sound waveform of the note, corresponding to note representation 812. Timbre textual information 812$_{TTI}$ represents information in the form of text (e.g., "Pick-Down") relating to timbre attribute symbol 812$_{TAS}$ (e.g., a pick-down timbre attribute symbol, indicating the articulation method employed).

Alternatively, GUI 100 displays supplemental information (not shown) in lower information bar 812$_{LIB}$ or in upper information bar 812$_{LIB}$, relating to note representation 812, such as statistical information (e.g., the number of times pick-down articulation is used), and the like. Amplitude envelope 812$_{AE}$ is a 2-D bipolar representation of an approximate variation of the amplitude of a sound waveform of the note, corresponding to note representation 812, in time.

The user of GUI 100 can manipulate in this magnified graphical representation of note representation 812 the particulars of the inner note representation information. For example, the user can change timbre attribute symbol 812$_{TAS}$ from that of a pick-down ▼ to that of a pick-up ▲, consequently altering timbre textual information 812$_{TTI}$ thereof accordingly. Conversely, the user can change timbre textual information 812$_{TTI}$ from "Pick-Down" to "Pick-Up", thereby altering timbre attribute symbol 812$_{TAS}$, accordingly. Additionally, the user can choose to display the pitch envelope (not shown) associated with note representation 812 therewith. The user can further choose to display the note name and octave numbering (e.g., A4, within upper information bar 812$_{UIB}$) associated with note representation 812 therewith.

Figure 9:
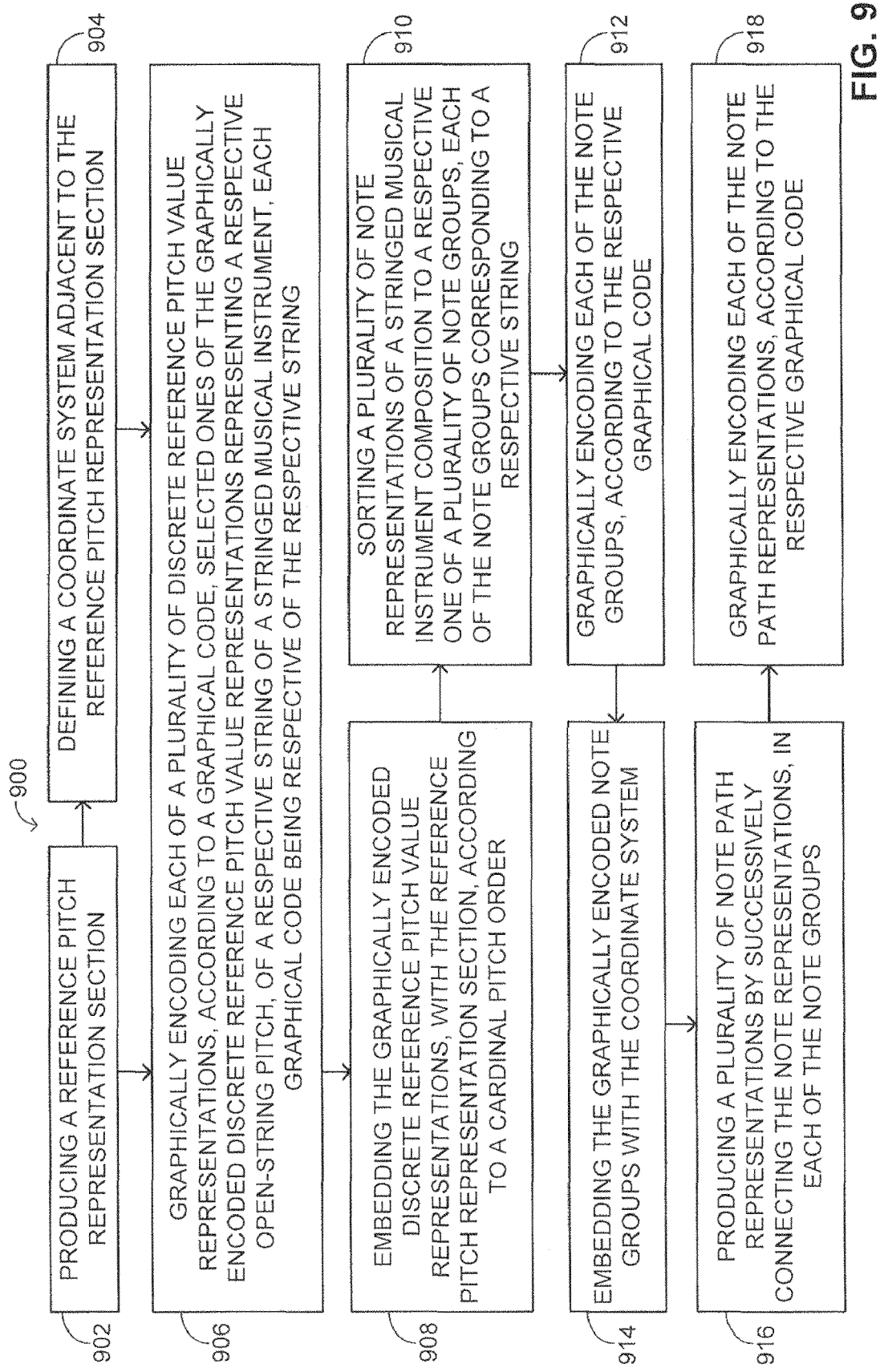
FIG. 9 is a schematic illustration of a method for providing a graphical musical user interface representation, operative in accordance with a further embodiment of the disclosed technique.

Reference is now made to FIGS. 9 and 2. FIG. 9 is a schematic illustration of a method for providing a graphical musical user interface representation, generally referenced 900, operative in accordance with a further embodiment of the disclosed technique. In procedure 902, a reference pitch representation section is produced. With reference to FIG. 2, GUI 100 includes piano-string span 108.

In procedure 904, a coordinate system adjacent to the reference pitch representation section is defined. With reference to FIG. 2, GUI 100 includes grid 106, adjacent to piano-string span 108.

In procedure 906, a plurality of discrete reference pitch value representations are graphically encoded, according to a graphical code. Selected ones of the graphically encoded discrete reference pitch value representations representing a respective open-string pitch of a respective string of a stringed musical instrument, each graphical code being respective of the respective string. With reference to FIG. 2, piano-string span 108 includes a plurality of graphically encoded discrete reference pitch value representations. Piano-string span 108 is divided into a plurality of dark-colored and light-colored horizontal strips. Selected ones of the graphically encoded discrete reference pitch values of piano-string span 108 represent a respective open-string pitch of the stringed musical instrument (e.g., horizontal strips colored blue, and red). The horizontal strip colored blue is respective of a particular string of the stringed musical instrument, while the horizontal strip colored red is respective of another string of the stringed musical instrument.

In procedure 908, the graphically encoded discrete reference pitch value representations are embedded with the reference pitch representation section, according to a cardinal pitch order. With reference to FIG. 2, the graphically encoded discrete reference pitch value representations are embedded with piano-string span 108, according to a particular order (e.g., an ascending pitch order, descending pitch order).

In procedure 910, the plurality of note representations of a stringed musical instrument composition is sorted to a respective one of a plurality of note groups. Each of the note groups corresponding to a respective string. With reference to FIG. 2, GUI 100 includes two note groups. Each group of the note representations represents a group of notes that are played from a specific string of the string instrument. FIG. 2 illustrates two groups of note representations, representing a string instrument possessing two strings. Note representations 124, 128, 132, 136, and 140 are sorted to Group 1, and note representations 152, 156, 162, 168, and 172 are sorted to Group 2.

In procedure 912, each of the note groups is graphically encoded according to the respective graphical code. With reference to FIG. 2, Group 1 and Group 2 are graphically encoded (i.e., color-coded blue and red, respectively).

In procedure 914 the graphically encoded note groups are embedded with the coordinate system. With reference to FIG. 2, Group 1 and Group 2 are embedded with grid 106, with respect to the plurality of rows 110$_1$, 110$_2$, 110$_N$, and plurality of columns 112$_1$, 112$_2$, 112$_m$.

In procedure 916, a plurality of note path representations are produced by successively connecting the note representations, in each of the note groups. With reference to FIG. 2, Group 1 includes four paths 126, 130, 134, and 138, which interconnect successive note representations, an open-string path 120, and two paths 122 and 142, which interconnect between the note representations and open-string path 120. Path 126 links note representations 124 and 128, path 130 links note representations 128 and 132, path 134 links note representations 132 and 136, and path 138 links note representations 136 and 140.

Group 2 includes two paths 154 and 170, which interconnect between successive note representations, an open-string path 150, and five paths 158, 160, 164, 166, and 174, which interconnect between the note representations and open-string path 150. Path 154 links note representations 152 and 156, path 170 links note representations 168 and 172. Paths 158 and 160 link note representations 156 and 162 through open-string path 150. Paths 164 and 166 link note representations 162 and 168 through open-string path 150.

In procedure 918, each of the note path representations are graphically encoded according to the respective graphical code. With reference to FIG. 2, Group 1 includes four paths 126, 130, 134, and 138, an open-string path 120, and two paths 122 and 142, which interconnect between the note representations and open-string path 120, all of which are color-coded blue. Group 2 includes two paths 154 and 170, which interconnect between successive note representations, an open-string path 150, and five paths 158, 160, 164, 166, and 174, which interconnect between the note representations and open-string path 150, all of which are color-coded red.

It will be appreciated by persons skilled in the art that the disclosed technique is not limited to what has been particularly shown and described hereinabove. Rather the scope of the disclosed technique is defined only by the claims, which follow.

The invention claimed is:

1. Graphical musical user interface representation for presenting a stringed musical instrument composition, the stringed musical instrument composition including a plurality of note representations, the graphical musical user interface representation comprising:
   a plurality of graphically encoded note path representations, located in a coordinate system of said graphical musical user interface representation, each of said graphically encoded note path representations corresponding to a respective open-string pitch, of a respective string of a stringed musical instrument, each of said graphically encoded note path representations comprising:
   a plurality of graphically encoded note representations of a respective note group of said note representations, said respective note group being associated with said respective string, each of said graphically encoded note path representations being encoded according to a respective graphical code, said respective graphical code being respective of said respective open-string pitch, each of said graphically encoded note representations representing respective tonal characteristics, relative to said respective open-string pitch, according to a coordinate of said respective graphically encoded note representation, in said coordinate system, and according to said respective graphical code; and
   a plurality of graphically encoded note transitions, each of said graphically encoded note transitions being respective of said respective note group, each of said graphically encoded note transitions being encoded according to said respective graphical code.

2. The graphical musical user interface representation according to claim 1, further comprising a plurality of graphically encoded discrete reference pitch value representations, located in a reference pitch representation section of said graphical musical user interface representation, adjacent to said coordinate system, selected ones of said graphically encoded discrete reference pitch value representations representing said respective open-string pitch, of said respective string of said stringed musical instrument, each of said graphically encoded discrete reference pitch value representations being encoded according to said respective graphical code.

3. The graphical musical user interface representation according to claim 2, wherein said coordinate system further comprises a graphical grid having a plurality of rows, and a plurality of columns, each of said rows representing a pitch, each of said columns representing a time interval.

4. The graphical musical user interface representation according to claim 3, wherein said columns are graphically encoded according to a meter of said stringed musical instrument composition.

5. The graphical musical user interface representation according to claim 3, wherein said rows are graphically encoded to correspond to respective ones of said graphically encoded discrete reference pitch value representations.

6. The graphical musical user interface representation according to claim 2, further comprising at least one string-range indicator, located in said reference pitch representation section, for indicating a playable pitch-range of respective said string.

7. The graphical musical user interface representation according to claim 1, wherein each said note group is distinctly graphically encoded.

8. The graphical musical user interface representation according to claim 1, wherein at least one dimension of each of said graphically encoded note representations represents a respective time duration.

9. The graphical musical user interface representation according to claim 1, wherein each of said graphically encoded note transitions connects between two adjacent said graphically encoded note representations of said respective note group.

10. The graphical musical user interface representation according to claim 2, wherein said selected ones of said graphically encoded discrete reference pitch value representations are graphically associated with respective ones of said graphically encoded note path representations.

11. The graphical musical user interface representation according to claim 10, wherein said graphic association is selected from the list consisting of:
   having a same horizontal coordinate in said coordinate system;
   graphical encoding;
   collective delineation;
   symbolic encoding; and
   textual encoding.

12. The graphical musical user interface representation according to claim 10, wherein said respective ones of said graphically encoded note path representations, define a respective open-string path when said respective ones are said graphically associated with respective said open-string pitch.

13. The graphical musical user interface representation according to claim 12, wherein at least a portion of said open-string path represents a rest in said stringed musical instrument composition.

14. The graphical musical user interface representation according to claim 12, further comprising a horizontal alignment time value parameter that defines a number of beats in said stringed musical instrument composition, corresponding substantially to a length of said open-string path.

15. The graphical musical user interface representation according to claim 1, wherein said graphically encoded note transitions, represent transitions between successive said graphically encoded note representations in each respective said note group.

16. The graphical musical user interface representation according to claim 1, further comprising a prioritization scheme that determines which of at least two of said graphically encoded note path representations is superimposed on which other of said graphically encoded note path representations.

17. The graphical musical user interface representation according to claim 1, further comprising a prioritization scheme that determines which of at least two of said graphically encoded note transitions is superimposed on which other of said graphically encoded note transitions.

18. The graphical musical user interface representation according to claim 1, wherein each of said graphically encoded note representations is modifiable according to at least one modifiable characteristic.

19. The graphical musical user interface representation according to claim 18, wherein said at least one modifiable characteristic is selected from the list consisting of:
 pitch;
 amplitude;
 timbre;
 duration;
 timing;
 sound effects;
 relocation in said coordinate system;
 graphical encoding;
 graphically encoded note representation insertion; and
 graphically encoded note representation deletion.

20. The graphical musical user interface representation according to claim 1, further comprising at least a timbre attribute symbol, wherein said timbre attribute symbol represents timbre characteristics associated with a play of a note on respective said string, said note being respective of a particular one of said graphically encoded note representations.

21. The graphical musical user interface representation according to claim 1, further comprising at least a fret number, wherein said fret number represents an identifier that identifies a fret of a stringed musical instrument, that is used to play a note on said string of respective said stringed musical instrument, said note being respective of a particular one of said graphically encoded note representations.

22. The graphical musical user interface representation according to claim 1, further comprising at least an amplitude envelope, wherein said amplitude envelope represents an approximate variation of amplitude of a sound waveform in time, said sound waveform associated with a respective note that is played on said respective string, said note being respective of a particular one of said graphically encoded note representations.

23. The graphical musical user interface representation according to claim 1, further comprising at least a peak amplitude indicator, wherein said peak amplitude indicator represents maximum value of an approximate variation of amplitude of a sound waveform said sound waveform associated with a respective note that is played on respective said string, said peak amplitude indicator being respective of a particular one of said graphically encoded note representations.

24. The graphical musical user interface representation according to claim 1, further comprising at least a pitch envelope, wherein said pitch envelope represents a variation of a substantially dominant pitch of a sound waveform in time, said sound waveform associated with a respective note that is played on respective said string, said pitch envelope associated with a respective one of said graphically encoded note representations.

25. The graphical musical user interface representation according to claim 1, further comprising at least textual data, wherein said textual data represents information associated with said respective one of said graphically encoded note representations.

26. The graphical musical user interface representation according to claim 20, wherein said timbre characteristics further comprise articulation, associated with respective said play of respective said note.

27. The graphical musical user interface representation according to claim 26, wherein said articulation is selected from the list consisting of:
 transitions between different said notes;
 playing manner of a particular said note;
 a pick-down picking pattern;
 a pick-up picking pattern;
 a slap picking pattern;
 a pop;
 a hammer-on;
 a pull-off;
 a tapping hammer-on;
 a tapping pull-off;
 a slide-up;
 a slide-down;
 a plucking slide-up; and
 a plucking slide-down.

28. The graphical musical user interface representation according to claim 20, wherein said timbre characteristics further comprises time-variable timbre characteristics that vary substantially throughout said play of respective said note.

29. The graphical musical user interface representation according to claim 28, wherein said time-variable timbre characteristics includes at least fret-buzz.

30. The graphical musical user interface representation according to claim 28, wherein said time-variable timbre characteristics includes at least overtone.

31. The graphical musical user interface representation according to claim 20, wherein a change to said timbre attribute symbol, correspondingly changes the respective said timbre characteristics said associated with the respective one of said graphically encoded note representations, according to said change.

32. The graphical musical user interface representation according to claim 20, further comprising a fret number, wherein said fret number represents an identifier that identifies a fret of a stringed musical instrument, that is used to play said note on said string of respective said stringed musical instrument, said note being respective of particular one of said graphically encoded note representations, wherein each one of said graphically encoded note representations is associated with respective said timbre characteristics, wherein a change to said fret number of a selected one of said graphically encoded note representations, correspondingly changes said timbre characteristics said associated with said selected one.

33. The graphical musical user interface representation according to claim 22, wherein a change to said amplitude envelope, correspondingly changes respective said approximate variation of said amplitude of the respective said sound waveform in time, respective of said particular one of said graphically encoded note representations.

34. The graphical musical user interface representation according to claim 23, wherein a change to said amplitude indicator correspondingly changes respective said maximum value of said amplitude of the respective said sound waveform, respective of said particular one of said graphically encoded note representations.

35. The graphical musical user interface representation according to claim 24, wherein a change to said pitch envelope correspondingly changes respective said variation of said substantially dominant pitch of respective said sound waveform in time, respective of said respective one of said graphically encoded note representations.

36. The graphical musical user interface representation according to claim 24, wherein at least two successive said pitch envelope, each associated with said respective one of said graphically encoded note representations, are connected together.

37. The graphical musical user interface representation according to claim 9, wherein a change to a selected one of said graphically encoded note representations, in at least one of a position in said coordinate system, and a dimension of said selected one, correspondingly changes said graphically encoded note transitions said adjacent to said selected one, according to said change.

38. The graphical musical user interface representation according to claim 1, wherein a change to a selected one of said graphically encoded note representations from respective said note group, in at least one of a position in said coordinate system, and a dimension of said selected one, changes respective one of said graphically encoded note path representations of said note group, according to said change.

39. The graphical musical user interface representation according to claim 1, wherein a change to a vertical position, within said coordinate system, of a selected one of said graphically encoded note representations, changes said respective tonal characteristics of said selected one, according to said change.

40. The graphical musical user interface representation according to claim 9, wherein said graphically encoded note transitions, previously connected to a deleted one of said graphically encoded note representations, interconnect.

41. The graphical musical user interface representation according to claim 1, wherein said graphically encoded note transitions further comprise graphical information pertaining to said stringed musical instrument composition.

42. The graphical musical user interface representation according to claim 1, further comprising a prioritization scheme that determines which of a timbre attribute symbol, a fret number, an amplitude envelope, a peak amplitude indicator, and a pitch envelope, is illustrated by said graphical musical user interface representation.

43. The graphical musical user interface representation according to claim 42, wherein at least one of said timbre attribute symbol, said fret number, said amplitude envelope, said peak amplitude indicator, and said pitch envelope is graphically encoded.

44. The graphical musical user interface representation according to claim 19, wherein a change of at least two of said pitch, said amplitude, said timbre, said duration, said timing, said sound effects, said relocation in said coordinate system, said graphical encoding, said graphically encoded note representation insertion, and said graphically encoded note representation deletion are independent of each other.

45. Method for providing a graphical musical user interface representation, the graphical musical user interface representation presenting a stringed musical instrument composition, the stringed musical instrument composition including a plurality of note representations, the method comprising the procedures of:

defining a coordinate system;

sorting said note representations to respective one of a plurality of note groups, each of said note groups corresponding to a respective string of a stringed musical instrument;

graphically encoding each of said note groups, according to a respective graphical code;

embedding said graphically encoded note groups with said coordinate system;

producing a plurality of note path representations by successively connecting said note representations, in each of said note groups; and graphically encoding each of said note path representations, according to said respective graphical code.

46. The method according to claim 45, further comprising the procedure of producing a reference pitch representation section, adjacent to said coordinate system.

47. The method according to claim 45, further comprising the procedure of graphically encoding each of a plurality of discrete reference pitch value representations, according to a graphical code, selected ones of said graphically encoded discrete reference pitch value representations representing a respective open-string pitch of respective said string of said stringed musical instrument, each said graphical code being respective of respective said string.

48. The method according to claim 45, further comprising the procedure of embedding said graphically encoded discrete reference pitch value representations, with said reference pitch representation section, according to a cardinal pitch order.

49. The method according to claim 45, further comprising the procedure of producing at least one of a timbre attribute symbol, a fret number, an amplitude envelope, a peak amplitude indicator, a pitch envelope and textual data, associated with a respective one of said graphically encoded note representations.

* * * * *